United States Patent
Kajiyama et al.

(10) Patent No.: US 12,348,127 B2
(45) Date of Patent: Jul. 1, 2025

(54) POWER CONVERSION DEVICE

(71) Applicant: Mitsubishi Electric Corporation, Tokyo (JP)

(72) Inventors: Takuya Kajiyama, Tokyo (JP); Toshiyuki Fujii, Tokyo (JP); Shuhei Fujiwara, Tokyo (JP); Yoshiyuki Kono, Tokyo (JP); Ryosuke Uda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 190 days.

(21) Appl. No.: 18/259,801

(22) PCT Filed: Jan. 15, 2021

(86) PCT No.: PCT/JP2021/001251
§ 371 (c)(1),
(2) Date: Jun. 29, 2023

(87) PCT Pub. No.: WO2022/153483
PCT Pub. Date: Jul. 21, 2022

(65) Prior Publication Data
US 2024/0072642 A1    Feb. 29, 2024

(51) Int. Cl.
*H02M 1/32* (2007.01)
*H02J 3/26* (2006.01)
(Continued)

(52) U.S. Cl.
CPC .............. *H02M 1/325* (2021.05); *H02J 3/36* (2013.01); *H02J 3/001* (2020.01); *H02J 3/26* (2013.01); *H02M 7/219* (2013.01); *H02M 7/4835* (2021.05)

(58) Field of Classification Search
CPC .... H02J 3/001; H02J 3/26; H02J 3/36; H02M 1/0009; H02M 1/32; H02M 1/325; H02M 7/219; H02M 7/4835
See application file for complete search history.

(56) References Cited

U.S. PATENT DOCUMENTS

2016/0109493 A1\* 4/2016 Cheng ................... H02J 3/1857
                                                        324/76.12
2018/0006580 A1\* 1/2018 Lung ....................... H02M 5/04
(Continued)

FOREIGN PATENT DOCUMENTS

JP          H1141812 A      2/1999
JP        2017143626 A      8/2017
(Continued)

OTHER PUBLICATIONS

Extended European Search Report dated Feb. 8, 2024, issued in the corresponding European Patent Application No. 21919376.0, 9 pages.
(Continued)

*Primary Examiner* — Fred E Finch, III
(74) *Attorney, Agent, or Firm* — BUCHANAN, INGERSOLL & ROONEY PC

(57) ABSTRACT

A power conversion device includes a power converter connected between a multi-phase alternating-current circuit and a direct-current circuit, and a control device to control the power converter. The control device detects an unbalanced component indicating a voltage unbalanced component or a current unbalanced component of the alternating-current circuit and limits a magnitude of an alternating current flowing between the power converter and the alternating-current circuit based on the unbalanced component.

20 Claims, 15 Drawing Sheets

(51) Int. Cl.
  *H02J 3/36*    (2006.01)
  *H02J 3/00*    (2006.01)
  *H02M 7/219*   (2006.01)
  *H02M 7/483*   (2007.01)

(56) References Cited

U.S. PATENT DOCUMENTS

2020/0412275 A1* 12/2020 Virta .............. H02M 7/53871
2022/0200481 A1*  6/2022 Bani Shamseh .......... H02J 3/01

FOREIGN PATENT DOCUMENTS

JP   2019092290 A   6/2019
WO   2020079817 A1  4/2020

OTHER PUBLICATIONS

Mahamedi, et al., "Sequence-Based Control Strategy With Current Limiting for the Fault Ride-Through of Inverter-Interfaced Distributed Generators", IEEE Transactions on Sustainable Energy, vol. 11, No. 1, Jan. 2020, pp. 165-174.
International Search Report (PCT/ISA/210) with English translation and Written Opinion (PCT/ISA/237) mailed on Mar. 16, 2021, by the Japanese Patent Office as the International Searching Authority for International Application No. PCT/JP2021/001251.

* cited by examiner (a)　　　　　　　　　　(b)

POWER CONVERSION DEVICE

TECHNICAL FIELD

The present disclosure relates to a power conversion device.

BACKGROUND ART

For high voltage direct current (HVDC), a power conversion device for converting alternating-current system power into direct-current power or converting direct-current power into alternating-current power is used. The power conversion device is required to have high operation continuity even in the event of a system fault, and is further required to quickly return to the normal operation upon recovery from the system fault.

In a power system employing a three-phase alternating-current system, when a ground fault such as a lightning strike is removed, there is a possibility that one of the three phases may go into an open-phase state (hereinafter, referred to as a "single open-phase fault"). When the single open-phase fault occurs, a voltage is induced from the sound phases to the open phase, which may prevent the single open-phase fault from being detected. Therefore, Japanese Patent Laying-Open No. 2019-92290 discloses an open-phase detection device designed to effectively detect the single open-phase fault.

CITATION LIST

Patent Literature

PTL 1: Japanese Patent Laying-Open No. 2019-92290

SUMMARY OF INVENTION

Technical Problem

During the open-phase fault, when a power converter outputs a current as usual, an overcurrent flows through the power converter, and the power converter stops operation to protect itself. On the other hand, upon removal of the open-phase fault, the power converter is required to quickly return to the normal operation (for example, output a current as usual).

It is therefore an object of an aspect of the present disclosure to provide a power conversion device capable of continuing operation even during an open-phase fault and quickly returning to normal operation upon removal of the open-phase fault.

Solution to Problem

A power conversion device according to an embodiment includes a power converter connected between a multi-phase alternating-current circuit and a direct-current circuit, and a control device to control the power converter. The control device detects an unbalanced component indicating a voltage unbalanced component or a current unbalanced component of the alternating-current circuit, and limits a magnitude of an alternating current flowing between the power converter and the alternating-current circuit based on the unbalanced component.

Advantageous Effects of Invention

The power conversion device according to the present disclosure can continue operation even during the open-phase fault and quickly return to the normal operation upon removal of the open-phase fault.

DESCRIPTION OF EMBODIMENTS

Figure 1:
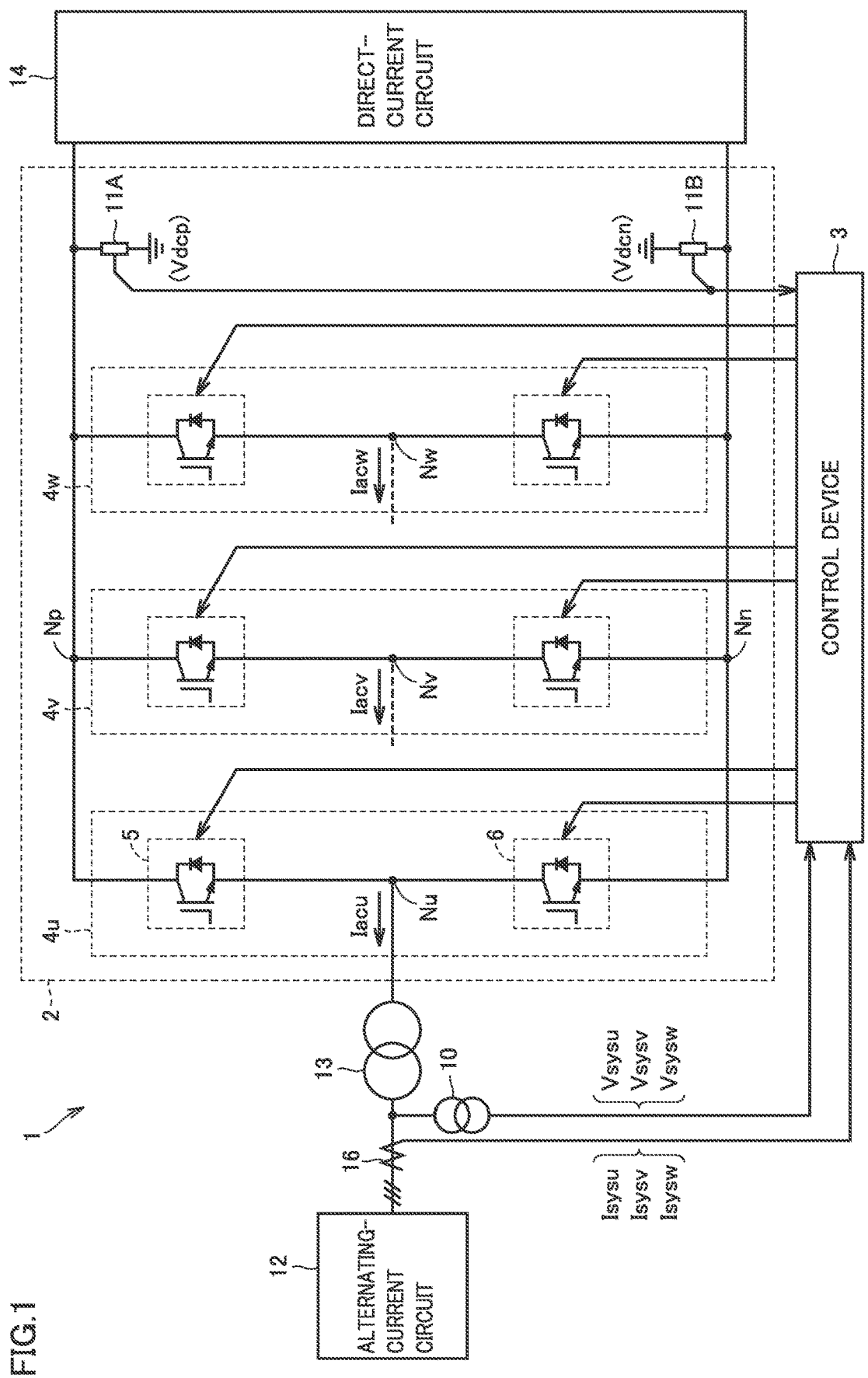
FIG. 1 is a schematic configuration diagram of a power conversion device according to a first embodiment.

With reference to the drawings, embodiments will be described below. In the following description, the same components are denoted by the same reference numerals. Names and functions of such components are also the same. Therefore, no redundant detailed description will be given of such components.

First Embodiment

<Overall Configuration of Power Conversion Device>

FIG. 1 is a schematic configuration diagram of a power conversion device according to a first embodiment. With reference to FIG. 1, a power conversion device 1 includes a power converter 2 and a control device 3 that controls power converter 2. Power converter 2 is connected between a direct-current circuit 14 and a multi-phase (for example, three-phase) alternating-current circuit 12. In the example illustrated in FIG. 1, power converter 2 is an AC-DC converter also referred to as a two-level converter.

Power converter 2 includes a plurality of leg circuits 4u, 4v, and 4w (hereinafter, may be collectively or arbitrarily referred to as a "leg circuit 4") connected in parallel with each other between a positive direct-current terminal (that is, a high potential-side direct-current terminal) Np and a negative direct-current terminal (that is, a low potential-side direct-current terminal) Nn.

Leg circuit 4 is provided for each phase of polyphase alternating current, is connected between alternating-current circuit 12 and direct-current circuit 14, and performs power conversion between the circuits. FIG. 1 illustrates a case where alternating-current circuit 12 is adapted to three-phase alternating current, and three leg circuits 4u, 4v, and 4w are provided corresponding to a u phase, a v phase, and a w phase, respectively.

Alternating-current terminals Nu, Nv, and Nw provided in leg circuits 4u, 4v, and 4w, respectively, are connected to alternating-current circuit 12 via a transformer 13. Alternating-current circuit 12 is, for example, an alternating-current power system including an alternating-current power supply and the like. In FIG. 1, connections between alternating-current terminals Nv and Nw and transformer 13 are not illustrated for ease of illustration. The direct-current terminals commonly provided in each leg circuit 4 (that is, positive direct-current terminal Np and negative direct-current terminal Nn) are connected to direct-current circuit 14. Direct-current circuit 14 is, for example, a direct-current power system including a direct-current power supply network and the like, or a direct-current terminal of another power conversion device. In the latter case, a back to back (BTB) system for connecting alternating-current power systems having different rated frequencies or the like is constructed of two power conversion devices coupled together. Leg circuits 4v and 4w have the same configuration, so that leg circuit 4u will be described below as a representative.

Leg circuit 4u includes an upper arm 5 connected between positive direct-current terminal Np and alternating-current terminal Nu, and a lower arm 6 connected between negative direct-current terminal Nn and alternating-current terminal Nu. Note that the upper arm is also referred to as a positive arm, and the lower arm is also referred to as a negative arm. A connection point between upper arm 5 and lower arm 6 is connected to transformer 13 as alternating-current terminal Nu. Positive direct-current terminal Np and negative direct-current terminal Nn are connected to direct-current circuit 14. Upper arm 5 and lower arm 6 of each of leg circuits 4u, 4v, and 4w each have a configuration where a freewheeling diode (FWD) is connected in antiparallel to a self-arc-extinguishing switching element capable of controlling both ON operation and OFF operation. For example, as such a switching element, a semiconductor switching element such as an insulated gate bipolar transistor (IGBT), a gate commutated turn-off thyristor (GCT), or a metal oxide semiconductor field-effect transistor (MOSFET) is used.

Leg circuits 4u, 4v, and 4w may be connected to alternating-current circuit 12 via an interconnection reactor instead of transformer 13 illustrated in FIG. 1.

Power conversion device 1 further includes an alternating-current voltage detector 10, an alternating-current detector 16, and direct-current voltage detectors 11A and 11B. Such detectors measure an electrical quantity (that is, current and voltage) used in control of power conversion device 1. Signals detected by the detectors are input to control device 3. Control device 3 outputs a gate control signal for controlling operation of each sub-module 7 based on the signal detected by each detector described above. For example, the gate control signal is a pulse width modulation (PWM) signal. Note that, in the following description, it is assumed that each signal is converted on a per unit (PU) basis in control device 3.

Alternating-current voltage detector 10 detects a U-phase alternating-current voltage Vsysu, a V-phase alternating-current voltage Vsysv, and a W-phase alternating-current voltage Vsysw of alternating-current circuit 12. In the following description, Vsysu, Vsysv, and Vsysw are also collectively referred to as Vsys. Alternating-current voltages Vacu, Vacv, and Vacw at alternating-current terminals Nu, Nv, and Nw of power converter 2 each correspond to a secondary voltage of transformer 13 (that is, a voltage at a power converter 2 side). Therefore, alternating-current voltages Vacu, Vacv, and Vacw can be obtained from alternating-current voltages Vsysu, Vsysv, and Vsysw detected by alternating-current voltage detector 10 with a transformation ratio, an impedance drop, and a connection system of transformer 13 taken into consideration. Note that when an interconnection reactor is used instead of transformer 13, alternating-current voltages Vacu, Vacv, and Vacw can be obtained from alternating-current voltages Vsysu, Vsysv, and Vsysw with reactance of the interconnection reactor taken into consideration. In the following description, Vacu, Vacv, and Vacw are also collectively referred to as Vacs. Further, in the present embodiment, a configuration where control device 3 performs control using alternating-current voltage Vsys will be described, or alternatively, control device 3 may be configured to perform control using alternating-current voltage Vac.

Alternating-current detector 16 detects a U-phase alternating current Isysu, a V-phase alternating current Isysv, and a W-phase alternating current Isysw of alternating-current circuit 12. In the following description, Isysu, Isysv, and Isysw are also collectively referred to as Isys.

A U-phase alternating current Iacu, a V-phase alternating current Iacv, and a W-phase alternating current Iacw output from power converter 2 to alternating-current circuit 12 are also collectively referred to as an alternating current Iac. Alternating current Iac corresponds to a secondary current of transformer 13 (that is, a current at the power converter 2 side). In FIG. 1, alternating-current detector 16 is configured to detect alternating current Isys that is a primary current of transformer 13 (that is, a current at an alternating-current circuit 12 side), or alternatively, alternating-current detector 16 may be configured to detect alternating current Iac that is a secondary current of transformer 13. Further, alternating current Iac can be obtained with alternating current Isys, and the transformation ratio and the connection system of transformer 13 taken into consideration. Note that in a case where an interconnection reactor is used instead of transformer 13, alternating current Iac and alternating current Isys coincide with each other. In the present embodiment, a configuration where control device 3 performs control using both alternating current Iac and alternating current Isys will be described, or alternatively, control device 3 may be configured to perform control using only alternating current Isys or perform control using only alternating current Iac.

Direct-current voltage detector 11A detects a direct-current voltage Vdcp at positive direct-current terminal Np connected to direct-current circuit 14. Direct-current voltage detector 11B detects a direct-current voltage Vdcn at negative direct-current terminal Nn connected to direct-current circuit 14. A difference between direct-current voltage Vdcp and direct-current voltage Vdcn is referred to as a direct-current voltage Vdc.

<Example of Hardware Configuration of Control Device>

Figure 2:
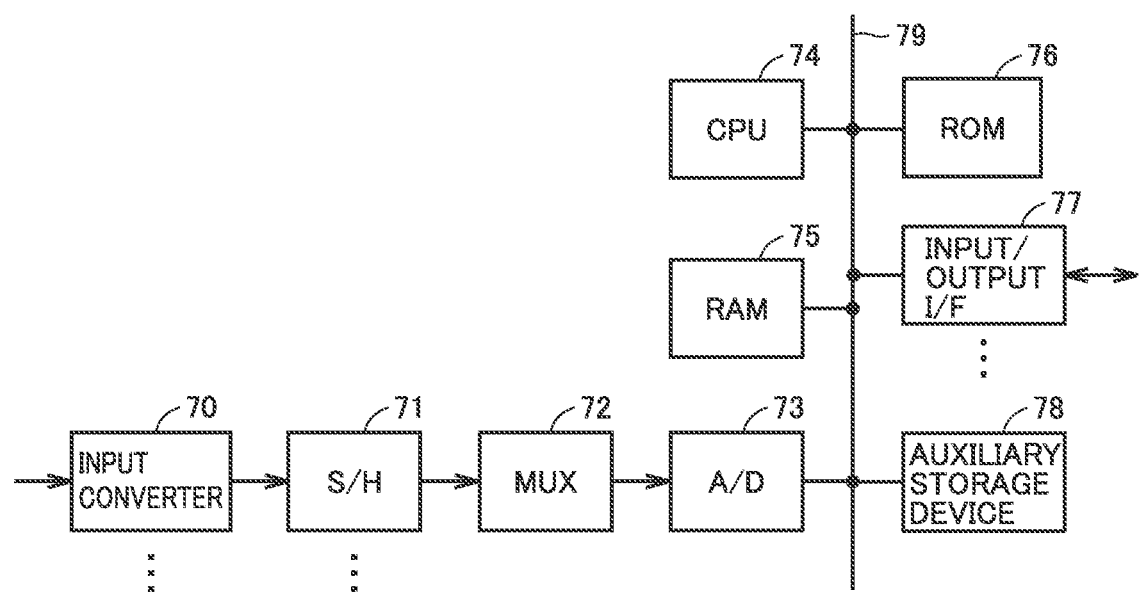
FIG. 2 is a block diagram illustrating an example of a hardware configuration of a control device according to the first embodiment.
Figure 3:
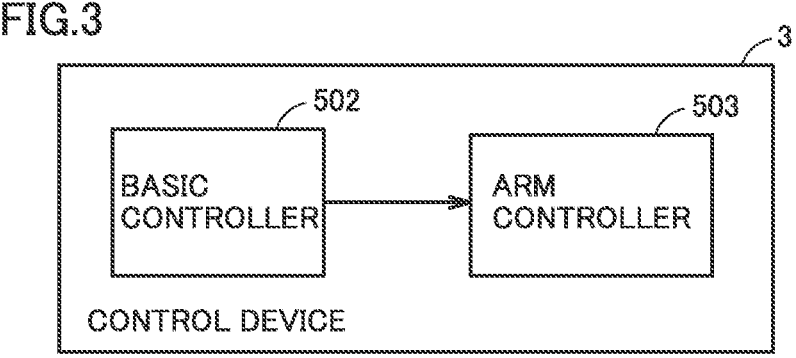
FIG. 3 is a diagram illustrating an internal configuration of the control device according to the first embodiment.

FIG. 2 is a block diagram illustrating an example of a hardware configuration of control device 3. FIG. 3 illustrates an example where control device 3 includes a computer.

Control device 3 includes one or more input converters 70, one or more sample and hold circuits 71, a multiplexer (MUX) 72, and an analog to digital (A/D) converter 73. Control device 3 further includes one or more central processing units (CPUs) 74, a random access memory (RAM) 75, and a read only memory (ROM) 76. Control device 3 further includes one or more input/output interfaces 77, an auxiliary storage device 78, and a bus 79 that interconnects the above-described components.

Input converter 70 has an auxiliary transformer for each input channel. Each auxiliary transformer converts a signal detected by each electrical quantity detector illustrated in FIG. 1 into a signal of a voltage level suitable for subsequent signal processing.

Sample and hold circuit 71 is provided for each input converter 70. Sample and hold circuit 71 samples and holds a signal representing the electrical quantity received from a corresponding input converter 70 at a specified sampling frequency.

Multiplexer 72 sequentially selects from among the signals held in the plurality of sample and hold circuits 71. A/D converter 73 converts the signal selected by multiplexer 72 into a digital value. Note that a plurality of A/D converters 73 may be provided so as to allow A/D conversion to be performed in parallel on the detection signals of the plurality of input channels.

CPU 74 controls the whole of control device 3 and performs operation processing in accordance with a program. RAM 75 as a volatile memory and ROM 76 as a non-volatile memory are used as a primary storage of CPU 74. ROM 76 stores a program, a setting value for signal processing, and the like. Auxiliary storage device 78 is a non-volatile memory larger in capacity than ROM 76, and stores a program, data of an electrical quantity detection value, and the like.

Input/output interface 77 is an interface circuit for establishing communication between CPU 74 and an external device.

Note that control device 3 may be at least partially made up of a circuit such as a field programmable gate array (FPGA) or an application specific integrated circuit (ASIC). Alternatively, control device 3 may be at least partially made up of an analog circuit.

<Example of Functional Configuration of Control Device>

FIG. 3 is a diagram illustrating an internal configuration of control device 3 according to the first embodiment. With reference to FIG. 3, control device 3 includes a basic controller 502 and an arm controller 503. Basic controller 502 and arm controller 503 are implemented by, for example, circuitry. The circuitry may be dedicated hardware, or may be CPU 74 that runs a program stored in an internal memory of control device 3. In a case where the circuitry is dedicated hardware, the circuitry includes, for example, an FPGA, an ASIC, or a combination of the FPGA and the ASIC.

Basic controller 502 generates three arm voltage command values Krefu, Krefv, and Krefw for upper arms 5 and lower arms 6 of the U phase, the V phase, and the W phase using the electrical quantity measured by each detector described above. In the following description of the first and second embodiments, in a case where it is not specified which one of the three arms is, three arm voltage command values Krefu, Krefv, and Krefw are simply referred to as an arm voltage command value Kref.

Arm controller 503 generates, based on each arm voltage command value Kref, a gate control signal GP for controlling on and off of the switching elements making up each arm, and outputs gate control signal GP to a corresponding switching element. Typically, arm controller 503 compares arm voltage command value Kref with a carrier signal, and generates gate control signal GP as a PWM signal based on the comparison result. For example, a triangle wave is used as the carrier signal.

Figure 4:
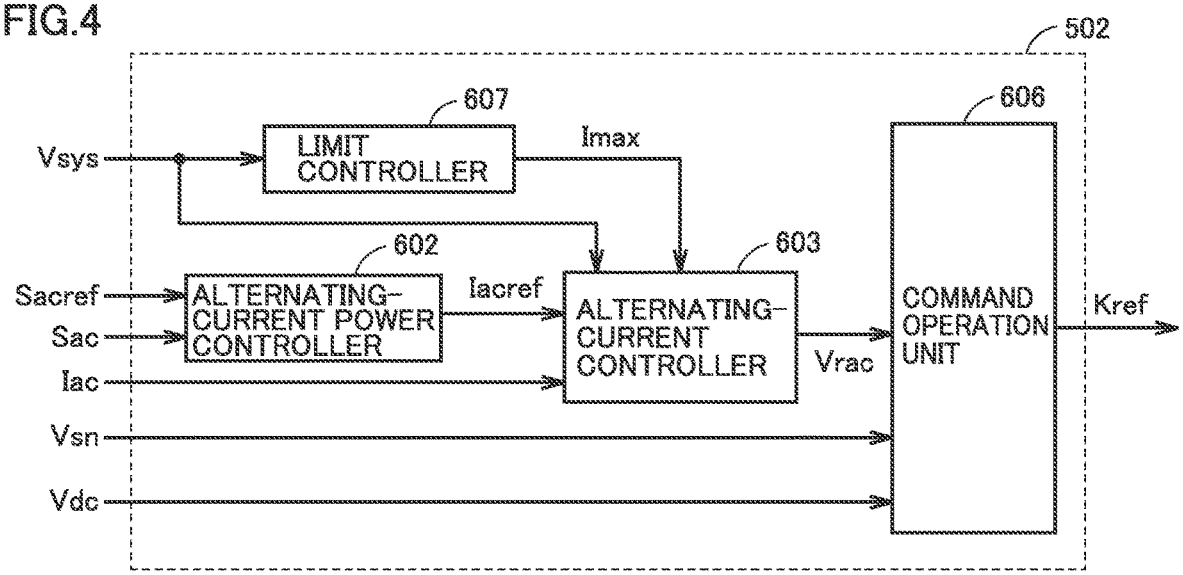
FIG. 4 is a diagram illustrating an internal configuration of a basic controller according to the first embodiment.

FIG. 4 is a diagram illustrating an internal configuration of basic controller 502 according to the first embodiment. With reference to FIG. 4, basic controller 502 includes an alternating-current power controller 602, an alternating-current controller 603, a command operation unit 606, and a limit controller 607.

Alternating-current power controller 602 generates an alternating-current command value Iacref, which is a command value of the alternating current output from power converter 2, by performing feedback control so as to make a deviation between alternating-current power Sac output from power converter 2 and an alternating-current power command value Sacref equal to zero. Alternating-current power Sac is calculated based on alternating-current voltage Vsys and alternating current Isys described with reference to FIG. 1. For example, alternating-current power command value Sacref is a value preset by a system operator or the like.

Alternating-current controller 603 generates an alternating-current control command value Vrac by performing feedback control so as to make a deviation between alternating current Iac flowing between power converter 2 and alternating-current circuit 12 and alternating-current command value Iacref equal to zero and feedforward control on alternating-current voltage Vsys. At this time, alternating-current command value Iacref is limited within a range based on an alternating-current limit value Imax determined by limit controller 607. The feedforward control on alternating-current voltage Vsys is performed to increase disturbance responsiveness to voltage fluctuations of alternating-current circuit 12. Note that alternating-current voltage Vsys need not be subjected to the feedforward control, or an alternating-current voltage command value instead of alternating-current voltage Vsys may be subjected to the feedforward control. Further, alternating-current controller 603 may be configured to generate alternating-current command value Iacref based on alternating current Iac. With this configuration, in a case where alternating current Iac is within a predetermined range (for example, less than or equal to alternating-current limit value Imax), the feedback control is stopped, and control is performed so as to output a prescribed alternating-current voltage. In this case, power converter 2 acts like an alternating-current voltage source within the predetermined range of alternating current Iac.

Limit controller 607 performs a feedback control operation so as to cause a voltage unbalanced component of alternating-current circuit 12 to follow a predetermined command value, and sets alternating-current limit value Imax indicating the limit value of alternating-current command value Iacref in accordance with the control operation result.

Command operation unit 606 receives alternating-current control command value Vrac, a neutral point voltage Vsn, and direct-current voltage Vdc. Command operation unit 606 generates arm voltage command value Kref for each arm based on alternating-current control command value Vrac, neutral point voltage Vsn, and direct-current voltage Vdc. In a case where power converter 2 has the alternating-current side connected to alternating-current circuit 12 via transformer 13, neutral point voltage Vsn has no influence on alternating-current circuit 12. Direct-current voltage Vdc is calculated as a difference between direct-current voltage Vdcp and direct-current voltage Vdcn. Note that a voltage between direct-current terminals Np and Nn may be directly measured, and the measured value may be used as direct-current voltage Vdc.

Figure 5:
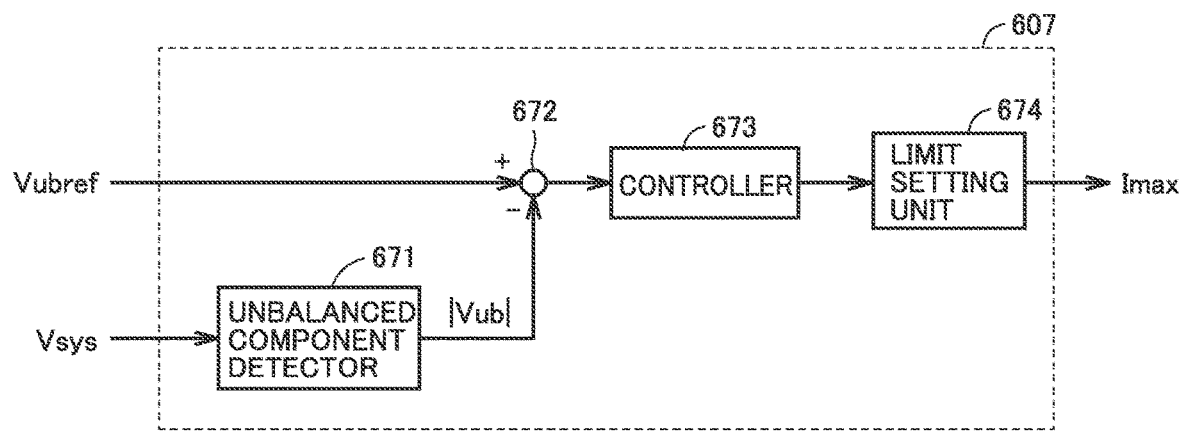
FIG. 5 is a diagram illustrating a specific configuration example of a limit controller according to the first embodiment.

FIG. 5 is a diagram illustrating a specific configuration example of limit controller 607 according to the first embodiment. With reference to FIG. 5, limit controller 607 includes an unbalanced component detector 671, a subtractor 672, a controller 673, and a limit setting unit 674.

Unbalanced component detector 671 detects a voltage unbalanced component Vub of alternating-current voltage Vsys. In one aspect, unbalanced component detector 671 detects, as voltage unbalanced component Vub, a difference Dv between a maximum value VAmax of magnitudes (for example, amplitude values or effective values) of alternating-current voltages Vsysu, Vsysv, and Vsysw of the respective phases and a minimum value VAmin of the magnitudes of alternating-current voltages Vsysu, Vsysv, and Vsysw of the respective phases (that is, Dv=VAmax−VAmin).

In another aspect, unbalanced component detector 671 detects an absolute value of a negative sequence voltage of alternating-current circuit 12 as voltage unbalanced component Vub. The following expression (1) is a voltage component conversion equation based on a method of symmetrical coordinates, and a constant γ is expressed by expression (2).

[Math. 1]

$$\begin{pmatrix} V0* \\ V1* \\ V2* \end{pmatrix} = \frac{1}{3} \begin{pmatrix} 1 & 1 & 1 \\ 1 & \gamma & \gamma^2 \\ 1 & \gamma^2 & \gamma \end{pmatrix} \begin{pmatrix} Vsysu* \\ Vsysv* \\ Vsysw* \end{pmatrix} \quad (1)$$

$$\gamma = e^{-\frac{2\pi}{3}} \quad (2)$$

V0*, V1*, V2*, Vsysu*, Vsysv*, and Vsysw* in expression (1) are phasor representations of a zero sequence voltage component V0, a positive sequence voltage component V1, and a negative sequence voltage component V2 of alternating-current circuit 12, and U-phase voltage Vsysu, V-phase voltage Vsysv, and W-phase voltage Vsysw of alternating-current circuit 12, respectively. Unbalanced component detector 671 detects an absolute value |V2| of negative sequence voltage component V2 calculated from expression (1) as voltage unbalanced component Vub.

Subtractor 672 subtracts voltage unbalanced component Vub from an unbalanced component command value Vubref. Controller 673 performs a control operation so as to make a deviation ΔVub between unbalanced component command value Vubref and voltage unbalanced component Vub (=Vubref−Vub) calculated by subtractor 672 equal to zero, and outputs control operation result. Controller 673 may be implemented as a PI controller that performs a proportional operation and an integral operation on deviation ΔVub, and may be further implemented as a PID controller that performs a differential operation. Further, controller 673 may be implemented as another controller used for feedback control. With this configuration, the feedback control is performed so as to make unbalanced component Vub equal to unbalanced component command value Vubref.

Even in a normal state with no open-phase fault (for example, no single open-phase fault) occurring in alternating-current circuit 12, voltage unbalanced component Vub does not become exactly zero and slightly larger than zero. Unbalanced component command value Vubref is used in detection of a voltage unbalance in the event of the open-phase fault. Therefore, unbalanced component command value Vubref is set larger than zero. Preferably, unbalanced component command value Vubref is larger than voltage unbalanced component Vub in the normal state, and is appropriately set within a range in which power converter 2 can operate. More preferably, unbalanced component command value Vubref is set by an operation based on voltage unbalanced component Vub in the normal state. Specifically, unbalanced component command value Vubref is set larger, by a specified value, than a value obtained by filtering voltage unbalanced component Vub in the normal state. For example, the filter processing is configured with a time-lag of first order of time constant sufficiently long relative to duration of a possible open-phase fault.

Limit setting unit 674 sets alternating-current limit value Imax based on the control operation result of controller 673 and outputs alternating-current limit value Imax thus set. Here, in a case where voltage unbalanced component Vub is larger than unbalanced component command value Vubref, deviation ΔVub becomes a negative value. In a case where controller 673 outputs a control operation result for compensating for negative deviation ΔVub, limit setting unit 674 decreases alternating-current limit value Imax. On the other hand, in a case where voltage unbalanced component Vub is smaller than unbalanced component command value Vubref, deviation ΔVub is a positive value. In a case where controller 673 outputs a control operation result for compensating for positive deviation ΔVub, limit setting unit 674 increases alternating-current limit value Imax. Note that alternating-current limit value Imax is set less than or equal to an allowable current value of power converter 2.

As described above, in a case where voltage unbalanced component Vub is larger than unbalanced component command value Vubref (that is, in a case where deviation ΔVub is a negative value), alternating-current limit value Imax is set smaller, and in a case where voltage unbalanced component Vub is smaller than unbalanced component command value Vubref (that is, in a case where deviation ΔVub is a positive value), alternating-current limit value Imax is set larger.

Figure 6:
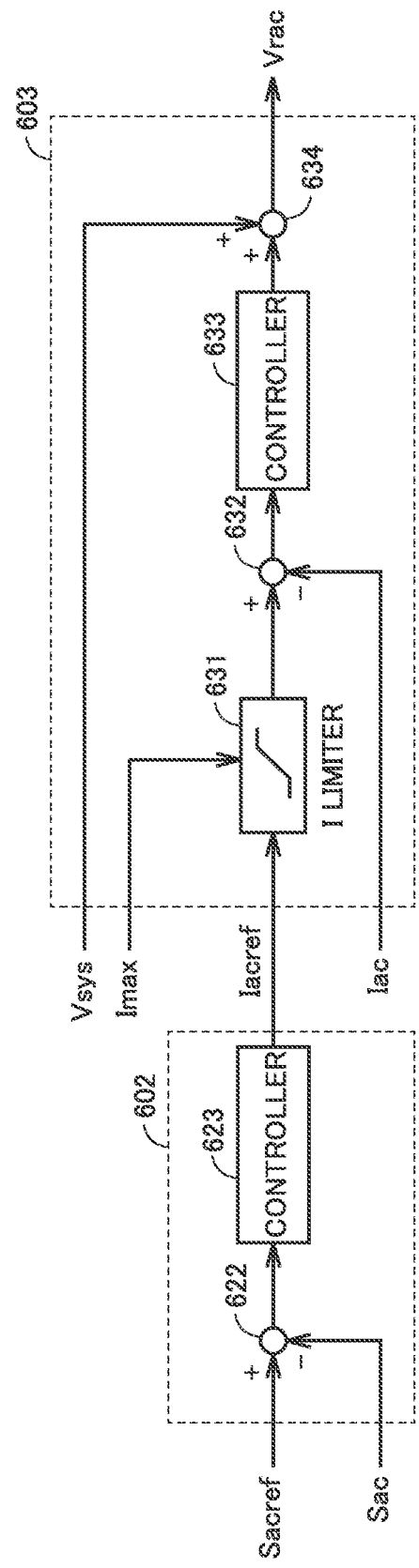
FIG. 6 is a block diagram illustrating a specific configuration example of an alternating-current power controller and an alternating-current controller according to the first embodiment.

FIG. 6 is a block diagram illustrating a specific configuration example of alternating-current power controller 602 and alternating-current controller 603. With reference to FIG. 6, alternating-current power controller 602 includes a subtractor 622 and a controller 623. Alternating-current controller 603 includes an I limiter 631, a subtractor 632, a controller 633, and an adder 634.

Subtractor 622 subtracts alternating-current power Sac from alternating-current power command value Sacref. Controller 623 performs a control operation so as to make a deviation ΔSac between alternating-current power command value Sacref and alternating-current power Sac calculated by subtractor 622 equal to zero, and outputs alternating-current command value Iacref as the control operation result. Controller 623 includes a PI controller, a PID controller, or the like.

I limiter 631 of alternating-current controller 603 limits alternating-current command value Iacref received from alternating-current power controller 602 within the range based on alternating-current limit value Imax set by limit controller 607 (specifically, limit setting unit 674). Specifically, in a case where alternating-current command value Iacref falls outside the appropriate range based on alternating-current limit value Imax (that is, the lower limit value: −Imax, and the upper limit value: +Imax), I limiter 631 limits alternating-current command value Iacref to the lower limit value (−Imax) or the upper limit value (+Imax).

Therefore, the smaller alternating-current limit value Imax set by limit setting unit 674, the larger the limit put on alternating-current command value Iacref. That is, since the lower limit value and the upper limit value approach zero, the appropriate range of alternating-current command value Iacref becomes smaller. On the other hand, in a case where alternating-current limit value Imax is large, the limit put on alternating-current command value Iacref is small, so that the appropriate range of alternating-current command value Iacref becomes larger.

Subtractor 632 subtracts alternating current Iac from alternating-current command value Iacref limited by I limiter 631. Controller 633 performs a control operation so as to make a deviation ΔIac between alternating-current command value Iacref and alternating current Iac calculated by subtractor 632 equal to zero, and outputs the control operation result. Controller 633 includes a PI controller, a PID controller, or the like.

Adder 634 adds up the control operation result of controller 633 and alternating-current voltage Vsys to generate alternating-current control command value Vrac. That is, adder 634 generates alternating-current control command value Vrac by performing feedforward control on alternating-current voltage Vsys.

As described above, limiting alternating-current command value Iacref in accordance with detected voltage unbalanced component Vub allows power conversion device 1 to continue operation during the open-phase fault, and to quickly return to the normal operation upon removal of the open-phase fault. Hereinafter, the reason will be described in detail.

In a case where the open-phase fault occurs in alternating-current circuit 12, the larger a magnitude (for example, an amplitude value or an effective value) of a current flowing to a portion in the open-phase state, the larger the voltage unbalanced component of alternating-current circuit 12. That is, the larger alternating current Iac output from power converter 2, the larger voltage unbalanced component of alternating-current circuit 12.

Limit controller 607 in FIG. 5 performs a control operation so as to make voltage unbalanced component Vub equal to desired unbalanced component command value Vubref, and sets alternating-current limit value Imax based on the control operation result. When voltage unbalanced component Vub becomes larger than unbalanced component command value Vubref in response to the occurrence of the open-phase fault, limit controller 607 sets alternating-current limit value Imax smaller, so that the appropriate range of alternating-current command value Iacref becomes smaller (that is, alternating-current command value Iacref is largely limited). Alternating-current controller 603 performs control such that alternating current Iac following limited alternating-current command value Iacref is output. Therefore, alternating current Iac output from power converter 2 is limited (that is, becomes smaller).

As described above, control device 3 limits the magnitude of alternating current Iac by limiting alternating-current command value Iacref within the range based on alternating-current limit value Imax. When alternating current Iac is limited, the current flowing to the portion in the open-phase state becomes smaller, thereby allowing a reduction in voltage unbalanced component Vub of alternating-current circuit 12.

On the other hand, when alternating-current circuit 12 enters a three-phase equilibrium state in response to the removal of the open-phase fault, there is no correlation between voltage unbalanced component Vub and alternating current Iac. That is, voltage unbalanced component Vub is less than unbalanced component command value Vubref regardless of the magnitude of alternating current Iac. In this case, limit controller 607 sets alternating-current limit value Imax equal to the maximum value (for example, the allowable alternating-current value), so that the appropriate range of alternating-current command value Iacref becomes the maximum (that is, alternating-current command value Iacref is not limited). Therefore, power converter 2 can output alternating current Iac for the normal operation.

According to the above, control device 3 limits the magnitude of alternating current Iac based on voltage unbalanced component Vub. Specifically, control device 3 limits the magnitude of the alternating current Iac based on the result of the control operation for causing voltage unbalanced component Vub to follow unbalanced component command value Vubref. Therefore, when voltage unbalanced component Vub becomes larger in response to the occurrence of the open-phase fault, alternating current Iac is controlled to decrease, so that power converter 2 need not stop operation for protection against overcurrent (for example, power converter 2 need not be gate-blocked). Power converter 2 can therefore continue operation even during the open-phase fault. Note that in a case where generated alternating-current command value Iacref is originally small, and alternating current Iac is small, there is a possibility that voltage unbalanced component Vub may be less than unbalanced component command value Vubref. In this case, power converter 2 continues operation without limiting alternating-current command value Iacref.

Further, when voltage unbalanced component Vub becomes smaller in response to the removal of the open-phase fault, the limit on alternating-current command value Iacref is removed, and alternating current Iac is controlled to increase, so that power converter 2 can quickly return to the normal operation.

<Modification>

In the example illustrated in FIGS. 4 to 6, the configuration where alternating-current command value Iacref is limited in accordance with voltage unbalanced component Vub has been described, but in the modification of the first embodiment, a configuration where alternating-current power command value Sacref is limited in accordance with voltage unbalanced component Vub will be described.

Figure 7:
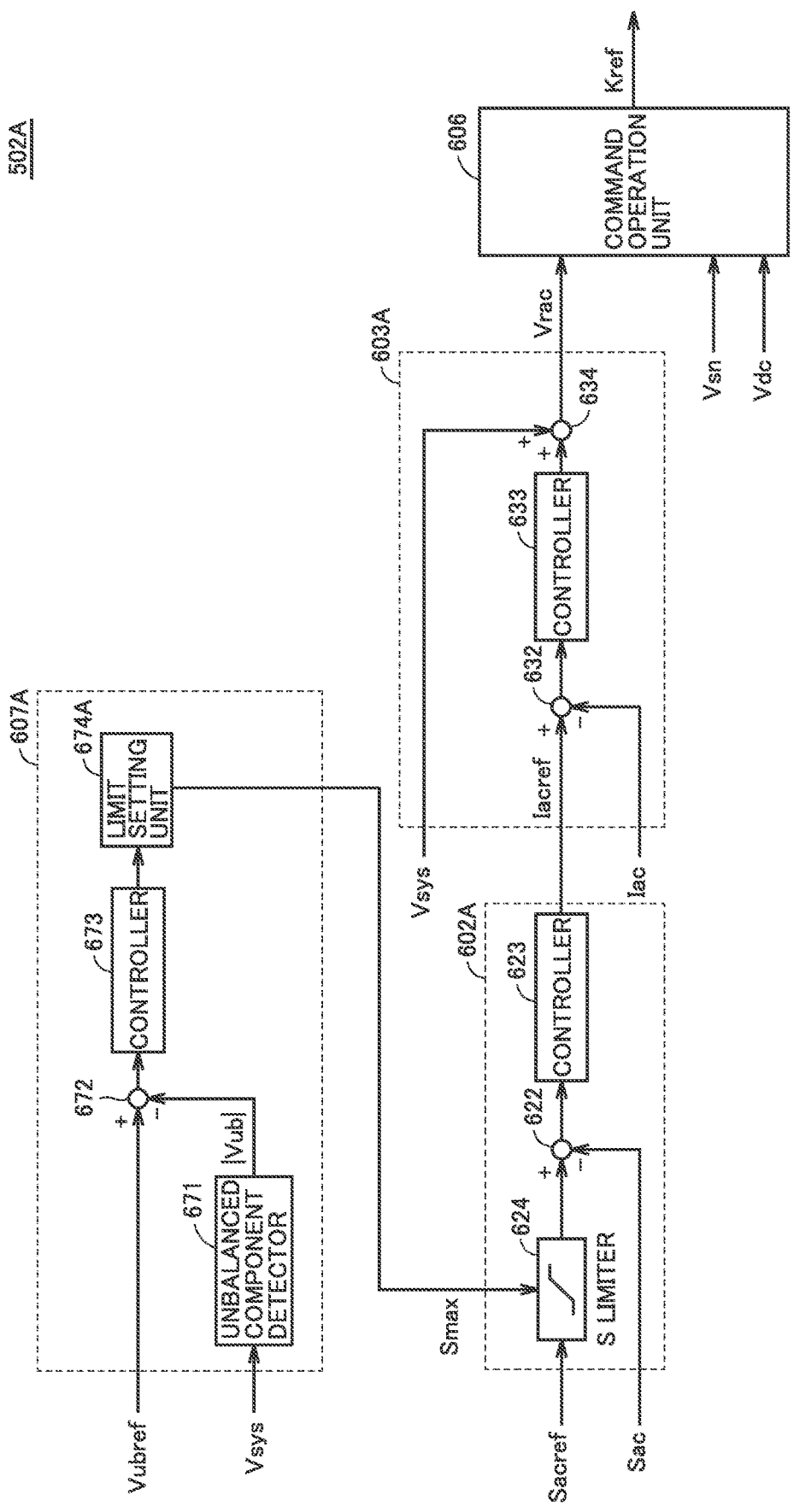
FIG. 7 is a block diagram illustrating an internal configuration of a basic controller according to a modification of the first embodiment.

FIG. 7 is a block diagram illustrating an internal configuration of a basic controller 502A according to a modification of the first embodiment. With reference to FIG. 7, basic controller 502A includes an alternating-current power controller 602A, an alternating-current controller 603A, a limit controller 607A, and command operation unit 606. Basic controller 502A corresponds to basic controller 502 illustrated in FIG. 2, but is denoted with an additional reference symbol "A" for convenience in order to be distinguished from other basic controllers. The same applies to the other embodiments.

Limit controller 607A sets an alternating-current power limit value Smax, which is a limit value of alternating-current power command value Sacref, by performing feedback control so as to cause voltage unbalanced component Vub of alternating-current circuit 12 to follow unbalanced component command value Vubref. Specifically, limit controller 607A is obtained by replacing limit setting unit 674 of limit controller 607 illustrated in FIG. 5 with a limit setting unit 674A.

Limit setting unit 674A sets alternating-current power limit value Smax based on the control operation result of controller 673, and outputs alternating-current power limit value Smax thus set. In a case where controller 673 outputs the result of the control operation for compensating for negative deviation ΔVub, limit setting unit 674A decreases alternating-current power limit value Smax. On the other hand, in a case where controller 673 outputs the result of the control operation for compensating for positive deviation ΔVub, limit setting unit 674A increases alternating-current power limit value Smax. Note that alternating-current power limit value Smax is set less than or equal to an allowable alternating-current power value of power converter 2.

As a result, in a case where voltage unbalanced component Vub is larger than unbalanced component command value Vubref (that is, in a case where deviation ΔVub is a negative value), alternating-current power limit value Smax is set smaller, and in a case where voltage unbalanced component Vub is smaller than unbalanced component command value Vubref (that is, in a case where deviation ΔVub is a positive value), alternating-current power limit value Smax is set larger.

Alternating-current power controller 602A includes an S limiter 624, subtractor 622, and controller 623. Specifically, alternating-current power controller 602A has a configuration obtained by adding S limiter 624 to alternating-current power controller 602 illustrated in FIG. 6.

S limiter 624 limits alternating-current power command value Sacref within a range based on alternating-current power limit value Smax set by limit setting unit 674A. Specifically, in a case where alternating-current power command value Sacref falls outside an appropriate range based on alternating-current power limit value Smax (that is, the lower limit value: −Smax, and the upper limit value: +Smax), S limiter 624 limits alternating-current power command value Sacref to the lower limit value (−Smax) or the upper limit value (+Smax).

Therefore, the smaller alternating-current power limit value Smax set by limit setting unit 674A, the larger the limit put on alternating-current power command value Sacref, so that the appropriate range of alternating-current power command value Sacref becomes smaller. On the other hand, in a case where alternating-current power limit value Smax is large, the limit put on alternating-current power command value Sacref is small, so that the appropriate range of alternating-current power command value Sacref becomes larger.

Subtractor 622 subtracts alternating-current power Sac from alternating-current power command value Sacref limited by S limiter 624. Controller 623 performs a control operation so as to make deviation ΔSac between alternating-current power command value Sacref and alternating-current power Sac calculated by subtractor 622 equal to zero, and outputs alternating-current command value Iacref as the control operation result.

Alternating-current controller 603A includes subtractor 632, controller 633, and adder 634. Specifically, alternating-current controller 603A has a configuration obtained by removing I limiter 631 from alternating-current controller 603 illustrated in FIG. 6.

Controller 633 performs a control operation so as to make a deviation ΔIac between alternating-current command value Iacref and alternating current Iac calculated by subtractor 632 equal to zero, and outputs the control operation result. Adder 634 adds up the control operation result of controller 633 and alternating-current voltage Vsys to generate alternating-current control command value Vrac.

With the configuration example illustrated in FIG. 7, control device 3 sets alternating-current power limit value Smax of alternating-current power command value Sacref for power converter 2 in accordance with the result of the control operation for causing voltage unbalanced component Vub to follow unbalanced component command value Vubref. Then, control device 3 limits the magnitude of alternating current Iac by limiting alternating-current power command value Sacref within the range based on alternating-current power limit value Smax.

Specifically, when voltage unbalanced component Vub becomes larger in response to the occurrence of the open-phase fault, limit controller 607A sets alternating-current power limit value Smax smaller, so that the appropriate range of alternating-current power command value Sacref becomes smaller. Alternating-current power controller 602A generates alternating-current command value Iacref for causing alternating-current power Sac to follow alternating-current power command value Sacref thus limited. Alternating-current controller 603A performs control so as to cause alternating current Iac to follow alternating-current command value Iacref thus generated. Therefore, limiting alternating-current power command value Sacref makes alternating current Iac output from power converter 2 smaller.

On the other hand, when alternating-current circuit 12 enters the three-phase equilibrium state in response to the removal of the open-phase fault, voltage unbalanced component Vub becomes less than unbalanced component command value Vubref regardless of the magnitude of alternating current Iac. In this case, limit controller 607A sets alternating-current power limit value Smax to the maximum value (for example, the allowable alternating-current power value), the appropriate range of alternating-current power command value Sacref becomes the maximum. Therefore, since alternating-current power command value Sacref is not limited, power converter 2 can output alternating current Iac for the normal operation.

As described above, even the configuration where alternating-current power command value Sacref is limited in accordance with voltage unbalanced component Vub produces the same actions and effects as produced by the configuration where alternating-current command value Iacref is limited.

<Advantages>

According to the first embodiment, it is possible to continue operation during the open-phase fault and to quickly return to the normal operation upon removal of the open-phase fault.

Second Embodiment

In a second embodiment, a configuration where active power and reactive power are individually limited will be described. The second embodiment is the same as the first embodiment in the overall configuration illustrated in FIG. 1, the hardware configuration of control device 3 illustrated in FIG. 2, and the configuration of control device 3 illustrated in FIG. 3.

<Configuration of Basic Controller>

Figure 8:
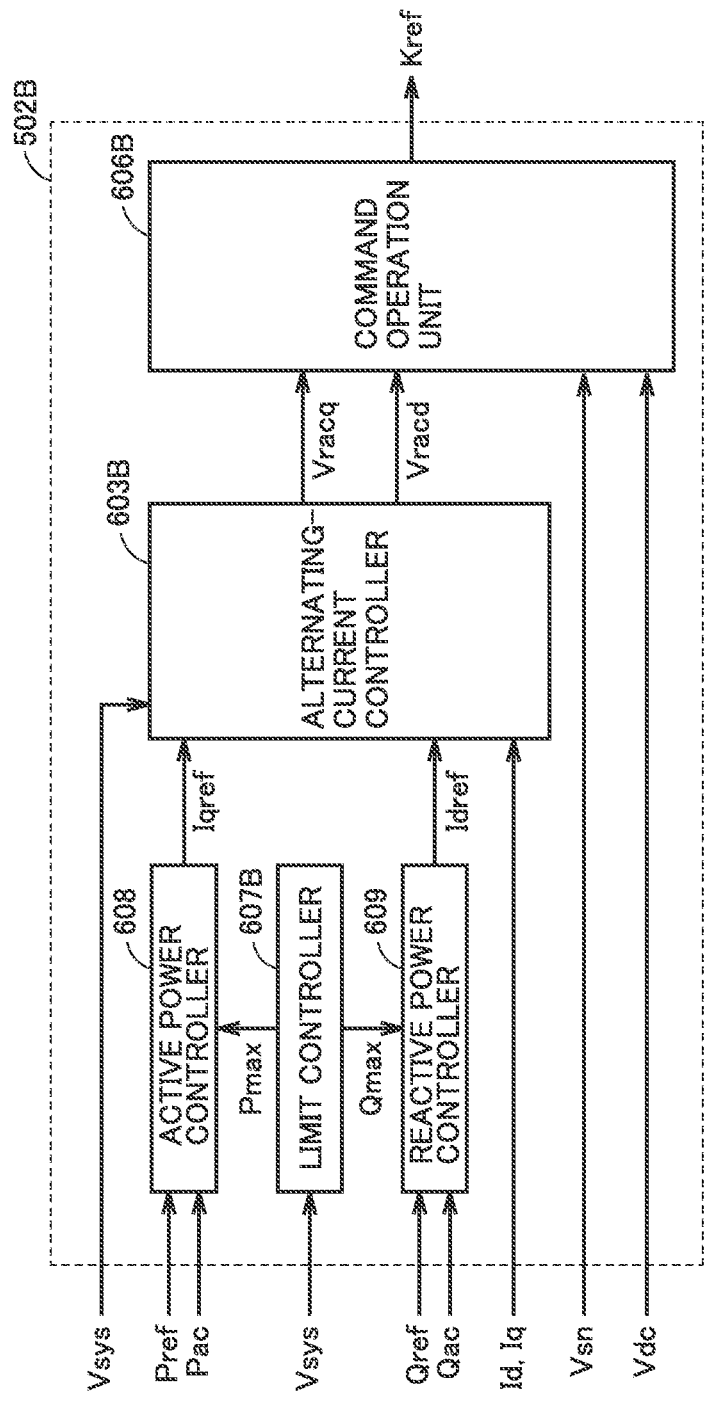
FIG. 8 is a diagram illustrating an internal configuration of a basic controller according to a second embodiment.

FIG. 8 is a diagram illustrating an internal configuration of a basic controller 502B according to the second embodiment. With reference to FIG. 8, basic controller 502B includes an alternating-current controller 603B, a command operation unit 606B, a limit controller 607B, an active power controller 608, and a reactive power controller 609.

Limit controller 607B sets an active power limit value Pmax indicating a limit value of an active power command value Pref and a reactive power limit value Qmax indicating a limit value of a reactive power command value Qref by performing feedback control so as to cause a voltage unbalanced component of alternating-current circuit 12 to follow an unbalanced component command value Vubref.

Active power controller 608 generates an active current command value Iqref, which is a command value of an active current output from power converter 2, by performing feedback control so as to make a deviation between active power command value Pref and active power Pac (that is, an active component of alternating-current power Sac) equal to zero. Active power Pac is calculated based on alternating-current voltage Vsys and alternating current Isys described with reference to FIG. 1. Active power command value Pref is, for example, a value preset by the system operator or the like. Note that active power command value Pref is limited within a range based on active power limit value Pmax set by limit controller 607B.

Reactive power controller 609 generates a reactive current command value Idref, which is a command value of a reactive current output from power converter 2, by performing feedback control so as to make a deviation between reactive power command value Qref and reactive power Qac (that is, a reactive component of alternating-current power Sac) equal to zero. Reactive power Qac is calculated based on alternating-current voltage Vsys and alternating current Isys described with reference to FIG. 1. Reactive power command value Qref is, for example, a value preset by the system operator or the like. Note that reactive power command value Qref is limited within a range based on reactive power limit value Qmax set by limit controller 607B.

Alternating-current controller 603B generates an active voltage command value Vracq by performing feedback control so as to make a deviation between an active current Iq and active current command value Iqref equal to zero and feedforward control on an active component of alternating-current voltage Vsys. Active voltage command value Vracq is an active component of alternating-current control command value Vrac described in the first embodiment.

Further, alternating-current controller 603B generates a reactive voltage command value Vracd by performing feedback control so as to make a deviation between a reactive current Id and reactive current command value Idref equal to zero and feedforward control on a reactive component of alternating-current voltage Vsys. Reactive voltage command value Vracd is a reactive component of alternating-current control command value Vrac described in the first embodiment.

Command operation unit 606B has substantially the same function as command operation unit 606 illustrated in FIG. 4 has. Command operation unit 606B receives active voltage command value Vracq and reactive voltage command value Vracd (that is, the active component and the reactive component of alternating-current control command value Vrac), a neutral point voltage Vsn, and a direct-current voltage Vdc. Command operation unit 606B generates an arm voltage command value Kref for each arm based on active voltage command value Vracq, reactive voltage command value Vracd, neutral point voltage Vsn, and direct-current voltage Vdc.

Figure 9:
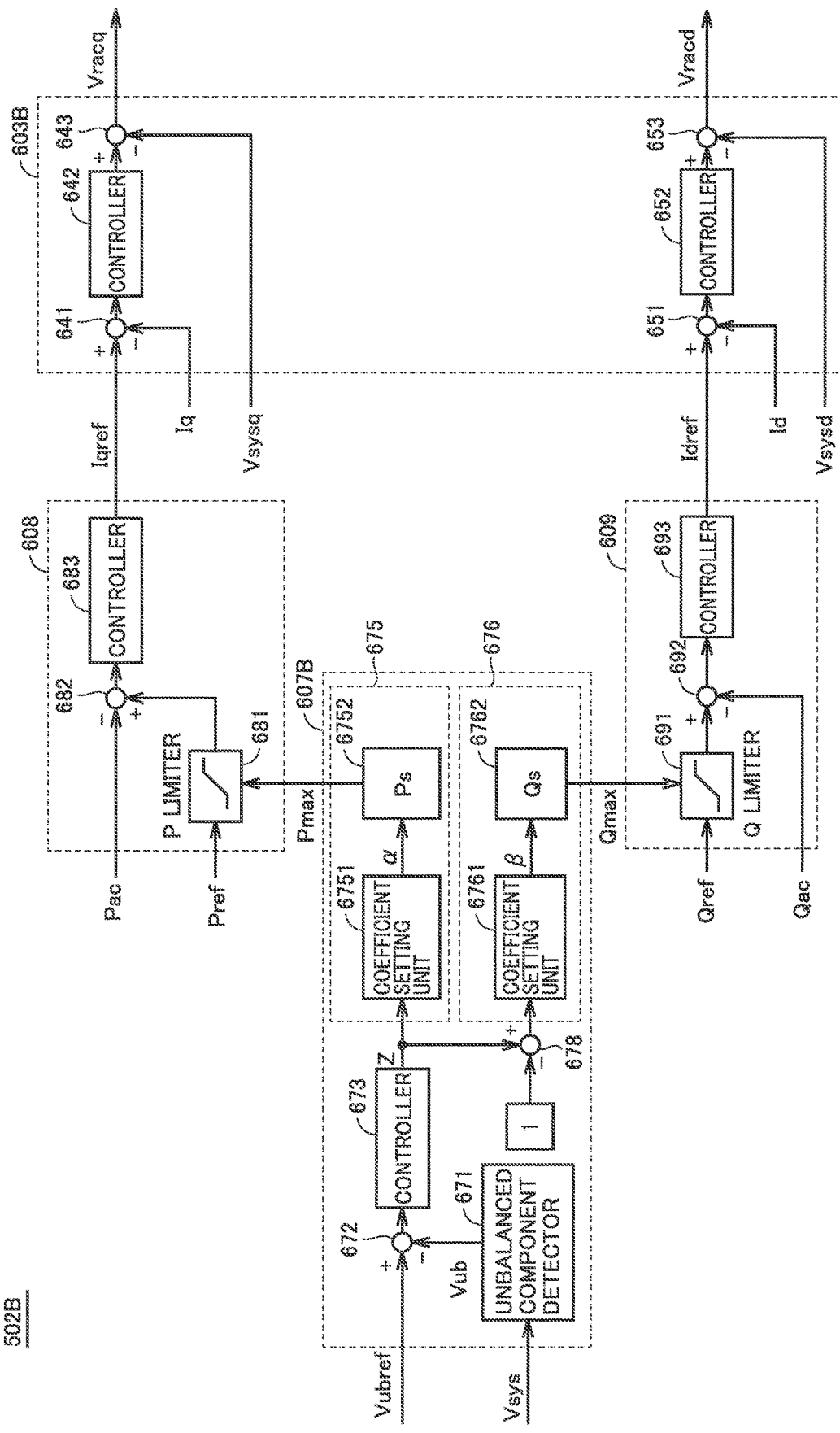
FIG. 9 is a diagram for describing a detailed configuration of the basic controller according to the second embodiment.

FIG. 9 is a diagram for describing a detailed configuration of basic controller 502B according to the second embodiment. Note that command operation unit 606B is not illustrated in FIG. 9. With reference to FIG. 9, limit controller 607B includes an unbalanced component detector 671, a subtractor 672, a controller 673, and limit setting units 675 and 676.

Controller 673 outputs, as a control operation result, a control operation value Z (where $0<Z\leq 2$) based on a magnitude of a deviation $\Delta$Vub for compensation. In a case where voltage unbalanced component Vub is larger than unbalanced component command value Vubref (that is, in a case where deviation $\Delta$Vub is a negative value), control operation value Z becomes smaller, and in a case where voltage unbalanced component Vub is smaller than unbalanced component command value Vubref (that is, in a case where deviation $\Delta$Vub is a positive value), control operation value Z becomes larger.

Limit setting unit 675 sets active power limit value Pmax based on the control operation result of controller 673. Specifically, limit setting unit 675 includes a setting unit 6751 and an operation unit 6752.

Setting unit 6751 sets a setting value $\alpha$ (where $0<\alpha\leq 1$) based on control operation value Z. Specifically, in a case of $1\leq Z\leq 2$, setting unit 6751 sets $\alpha=1$. In a case of $0<Z<1$, setting unit 6751 sets $\alpha=Z$. Operation unit 6752 outputs a value obtained by multiplying an allowable active power value Ps by a as active power limit value Pmax.

As a result, in a case where control operation value Z for compensating for deviation $\Delta$Vub that is less than a certain value is output (for example, $1\leq Z\leq 2$), active power limit value Pmax is set equal to allowable active power value Ps. On the other hand, in a case where control operation value Z for compensating for deviation $\Delta$Vub greater than or equal to the certain value is output (for example, $0\leq Z\leq 1$), active power limit value Pmax is set equal to "$\alpha$*Ps". In this case, $\alpha=Z$ is satisfied, so that the smaller control operation value Z, the smaller active power limit value Pmax is set, and the larger control operation value Z, the larger active power limit value Pmax is set.

Limit setting unit 676 sets reactive power limit value Qmax based on the control operation result of controller 673. Specifically, limit setting unit 676 includes a subtractor 678, a setting unit 6761, and an operation unit 6762. Subtractor 678 outputs, to setting unit 6761, a subtraction value obtained by subtracting a value "1" from control operation value Z (that is, Z−1). Setting unit 6761 sets a setting value $\beta$ (where $0\leq\beta\leq 1$) based on the subtraction value. Specifically, in a case of (Z−1)=1, setting unit 6761 sets $\beta=1$. In a case of $0<(Z-1)<1$, setting unit 6761 sets $\beta=(Z-1)$. In a case of $(Z-1)\leq 0$, setting unit 6761 sets $\beta=0$. Operation unit 6762 outputs, as reactive power limit value Qmax, a value obtained by multiplying an allowable reactive power value Qs by $\beta$.

As a result, in a case of (Z−1)=1, reactive power limit value Qmax is set equal to allowable reactive power value Qs. In a case of $0<(Z-1)\leq 1$, reactive power limit value Qmax is set equal to "$\beta$ *Qs". In this case, $\beta=(Z-1)$ is satisfied, so that the smaller control operation value Z, the smaller reactive power limit value Qmax is set, and the larger control operation value Z, the larger reactive power limit value Qmax is set. Further, in a case where a negative subtraction value is output (for example, $(Z-1)\leq 0$), $\beta=0$ is satisfied, so that reactive power limit value Qmax becomes equal to zero.

As a specific example, in a case where unbalanced component Vub is very small, and control operation value Z is equal to "2", setting unit 6751 sets setting value $\alpha$ equal to "1", and setting unit 6761 sets setting value $\beta$ equal to "1". As a result, active power limit value Pmax and reactive power limit value Qmax become the maximum, so that active power command value Pref and reactive power command value Qref are not limited. In a case where unbalanced component Vub is small, and control operation value Z is equal to "1.5", setting unit 6751 sets setting value α equal to "1", and setting unit 6761 sets setting value β equal to "0.5". As a result, active power limit value Pmax becomes the maximum and is thus not limited, but reactive power limit value Qmax is limited to 0.5 times allowable reactive power value Qs.

Active power controller 608 includes a P limiter 681, a subtractor 682, and a controller 683. P limiter 681 limits active power command value Pref within a range based on active power limit value Pmax set by limit setting unit 675. Specifically, in a case where active power command value Pref falls outside the appropriate range based on active power limit value Pmax (that is, the lower limit value: −Pmax, the upper limit value: +Pmax), P limiter 681 limits active power command value Pref to the lower limit value or the upper limit value.

Controller 683 performs a control operation so as to make a deviation ΔPac between active power command value Pref and active power Pac calculated by subtractor 682 equal to zero, and outputs active current command value Iqref as the control operation result. Controller 683 includes a PI controller, a PID controller, or the like.

Reactive power controller 609 includes a Q limiter 691, a subtractor 692, and a controller 693. Q limiter 691 limits reactive power command value Qref within a range based on reactive power limit value Qmax set by limit setting unit 676. Specifically, in a case where reactive power command value Qref falls outside the appropriate range based on reactive power limit value Qmax (that is, the lower limit value: −Qmax, the upper limit value: +Qmax), Q limiter 691 limits reactive power command value Qref to the lower limit value or the upper limit value.

Controller 693 performs a control operation so as to make a deviation ΔQac between reactive power command value Qref and reactive power Qac calculated by subtractor 691 equal to zero, and outputs reactive current command value Idref as the control operation result. Controller 693 includes a PI controller, a PID controller, or the like.

Alternating-current controller 603B includes subtractors 641 and 651, controllers 642 and 652, and adders 643 and 653. Controllers 641 and 651 each include a PI controller, a PID controller, or the like.

Controller 642 performs a control operation so as to make a deviation ΔIq between active current command value Iqref and active current Iq calculated by subtractor 641 equal to zero, and outputs the control operation result. Adder 643 generates active voltage command value Vracq by adding up the control operation result of controller 642 and an active component Vsysq of alternating-current voltage Vsys.

Controller 652 performs a control operation so as to make a deviation ΔId between reactive current command value Idref and reactive current Id calculated by subtractor 651 equal to zero, and outputs the control operation result. Adder 653 generates reactive voltage command value Vracd by adding up the control operation result of controller 652 and a reactive component Vsysd of alternating-current voltage Vsys.

With the configuration example illustrated in FIG. 9, control device 3 sets active power limit value Pmax of active power command value Pref for power converter 2 and reactive power limit value Qmax of reactive power command value Qref for power converter 2 in accordance with the result of the control operation for causing voltage unbalanced component Vub to follow unbalanced component command value Vubref. Then, control device 3 limits the magnitude of active component (that is, active current Iq) of alternating current Iac by limiting active power command value Pref within the range based on active power limit value Pmax thus set. Further, control device 3 limits the magnitude of reactive component (that is, reactive current Id) of alternating current Iac by limiting reactive power command value Qref within the range based on reactive power limit value Qmax thus set.

Specifically, when voltage unbalanced component Vub becomes larger in response to the occurrence of the open-phase fault, limit controller 607B sets active power limit value Pmax and reactive power limit value Qmax smaller, so that active power command value Pref and reactive power command value Qref are limited (that is, the appropriate range becomes smaller).

Active power controller 608 generates active current command value Iqref for causing active power Pac to follow active power command value Pref thus limited. Reactive power controller 609 generates reactive current command value Idref for causing reactive power Qac to follow reactive power command value Qref thus limited. Alternating-current controller 603B performs control so as to cause active current Iq to follow active current command value Iqref thus generated, and performs control so as to cause reactive current Id to follow reactive current command value Idref thus generated. Therefore, limiting active power command value Pref makes active current Iq output from power converter 2 smaller, and limiting reactive power command value Qref makes reactive current Id output from power converter 2 smaller. This makes a current flowing through a portion in the open-phase state smaller, thereby allowing a reduction in voltage unbalanced component Vub of alternating-current circuit 12.

On the other hand, when alternating-current circuit 12 enters the three-phase equilibrium state in response to the removal of the open-phase fault, voltage unbalanced component Vub becomes less than unbalanced component command value Vubref regardless of the magnitudes of the active and reactive components of alternating current Iac. In this case, for example, limit controller 607B sets active power limit value Pmax and reactive power limit value Qmax equal to their respective maximum values, so that active power command value Pref and reactive power command value Qref are not limited. Therefore, power converter 2 can output active current Iq and reactive current Id for the normal operation.

With the configuration of limit setting units 675 and 676 illustrated in FIG. 9, active power limit value Pmax is set equal to α times allowable active power value Ps, and reactive power limit value Qmax is set equal to β times allowable reactive power value Qs. As described above, setting value α is set based on control operation value Z, but setting value β is set based on the subtraction value (that is, Z−1), so that setting value β is a value less than or equal to setting value α. Therefore, reactive power command value Qref is limited in preference to active power command value Pref. For example, in a power converter designed to compensate for reactive power, such as a static synchronous compensator (STATCOM), direct-current circuit 14 illustrated in FIG. 1 includes a power storage element such as a capacitor, and the voltage of the power storage element is controlled based on the active component of alternating current. In such a case, when active power command value Pref is limited, the voltage of the power storage element of direct-current circuit 14 cannot be controlled, so that reactive power command value Qref is preferentially limited.

As an example other than the configuration example illustrated in FIG. 9, a configuration where active power command value Pref is limited in preference to reactive power command value Qref may be employed. In this case, limit controller 607B sets reactive power limit value Qmax equal to a times allowable reactive power value Qs, and sets active power limit value Pmax equal to R times allowable active power value Ps. For example, in a case where direct-current circuit 14 includes another power conversion device, a storage battery, or the like, the active component of alternating current can be freely set. Further, with a power filter, a phase modifier, and the like provided between alternating-current circuit 12 and power converter 2, it may be possible to stably continue operation by supplying reactive power to the power filter, the phase modifier, and the like. Therefore, in such a case, active power command value Pref is preferentially limited.

As still another example, active power command value Pref and reactive power command value Qref may be limited at a predetermined ratio. For example, the limit setting unit may be configured to set active power limit value Pmax equal to X times (where 0≤X≤1) allowable active power value Ps and set reactive power limit value Qmax equal to Y times (where 0≤Y≤1) allowable reactive power value Qs. Alternatively, only one of active power command value Pref or reactive power command value Qref may be limited (for example, X or Y is set equal to zero). Therefore, control device 3 may be configured to set at least one of active power limit value Pmax or reactive power limit value Qmax in accordance with the result of the control operation for causing voltage unbalanced component Vub to follow unbalanced component command value Vubref.

<Modification>

In the example illustrated in FIGS. 8 and 9, the configuration where active power command value Pref and reactive power command value Qref are limited in accordance with voltage unbalanced component Vub has been described, but in a modification of the second embodiment, a configuration where active current command value Iqref and reactive current command value Idref are limited in accordance with voltage unbalanced component Vub will be described.

Figure 10:
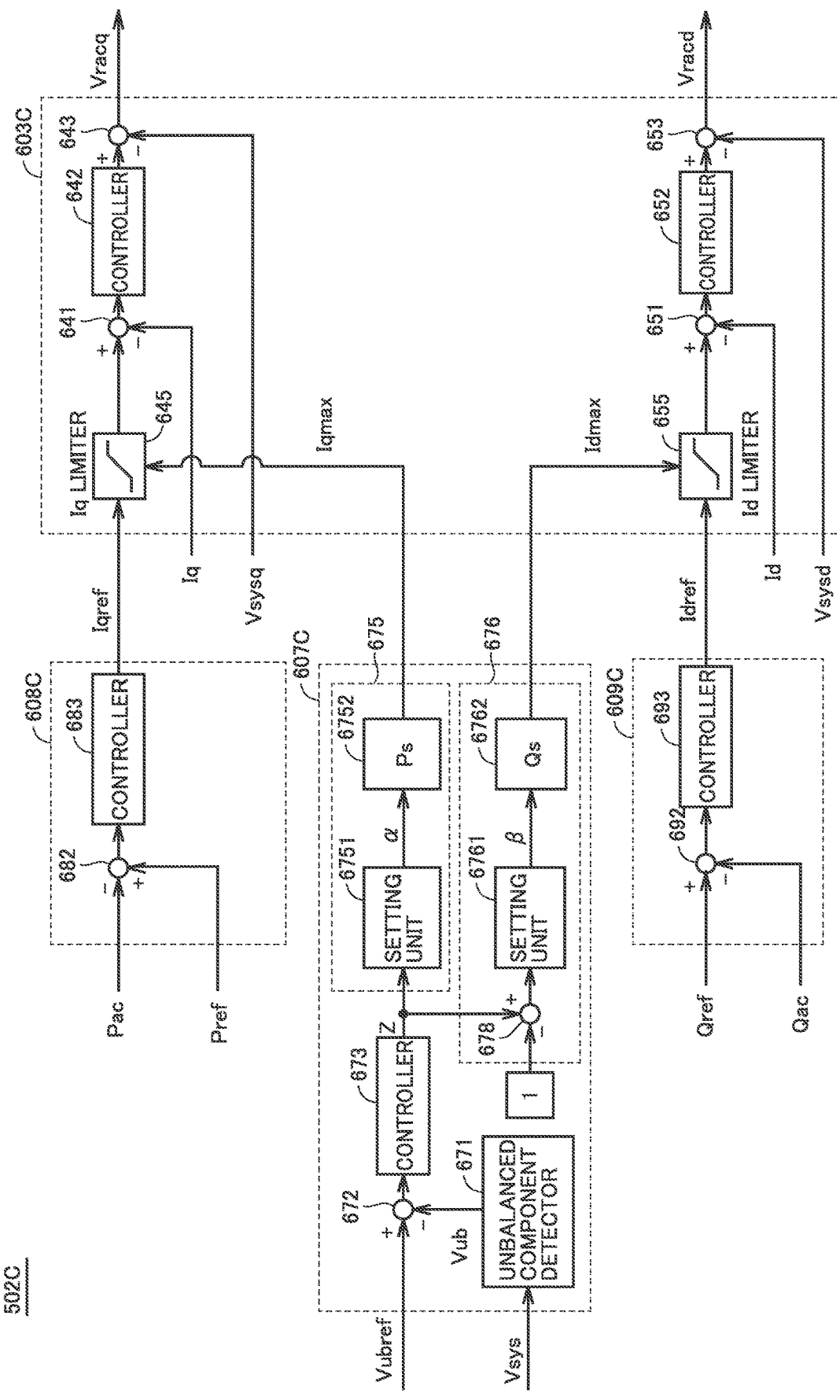
FIG. 10 is a block diagram illustrating an internal configuration of a basic controller according to a modification of the second embodiment.

FIG. 10 is a block diagram illustrating an internal configuration of a basic controller 502C according to a modification of the second embodiment. With reference to FIG. 10, basic controller 502C includes an alternating-current controller 603C, a limit controller 607C, an active power controller 608C, and a reactive power controller 609C. Note that command operation unit 606B illustrated in FIG. 8 is not illustrated in FIG. 10.

Limit controller 607C is different from limit controller 607B illustrated in FIG. 9 in that limit controller 607C sets an active current limit value Iqmax and a reactive current limit value Idmax. Specifically, limit controller 607C is obtained by replacing limit setting units 675 and 676 of limit controller 607B illustrated in FIG. 9 with limit setting units 675C and 676C, respectively.

Limit setting unit 675C sets active current limit value Iqmax equal to α times an allowable active current value Iqs based on the control operation result of controller 673. Specifically, limit setting unit 675C includes a setting unit 6751C and an operation unit 6752C.

In a case of 1≤Z≤2, setting unit 6751C sets α=1. In a case of 0<Z<1, setting unit 6751C sets α=Z. Operation unit 6752C outputs, to alternating-current controller 603C, a value obtained by multiplying allowable active current value Iqs by α as active current limit value Iqmax.

As a result, in a case of 1≤Z≤2, active current limit value Iqmax is set equal to allowable active current value Iqs. On the other hand, in a case of 0<Z<1, active current limit value Iqmax is set equal to "α*Iqs". In this case, the smaller control operation value Z, the smaller active current limit value Iqmax is set, and the larger control operation value Z, the larger active current limit value Iqmax is set.

Limit setting unit 676C sets reactive current limit value Idmax equal to R times an allowable reactive current value Ids based on the control operation result of controller 673. Specifically, limit setting unit 676C includes a subtractor 678, a setting unit 6761C, and an operation unit 6762C. Subtractor 678 outputs a subtraction value (that is, Z−1) to setting unit 6761C. In a case of (Z−1)=1, setting unit 6761C sets β=1. In a case of 0<(Z−1)<1, setting unit 6761C sets β=(Z−1). In a case where (Z−1)≤0, setting unit 6761C sets β=0. Operation unit 6762C outputs, to alternating-current controller 603C, a value obtained by multiplying allowable reactive current value Ids by R as reactive current limit value Idmax.

As a result, in a case of (Z−1)=1, reactive current limit value Idmax is set equal to allowable reactive current value Ids. In a case of 0<(Z−1)<1, reactive current limit value Idmax is set equal to "β *Ids". In this case, the smaller control operation value Z, the smaller active current limit value Idmax is set, and the larger control operation value Z, the larger reactive current limit value Idmax is set. In a case of (Z−1)≤0, β=0 is satisfied, so that reactive current limit value Idmax becomes equal to zero.

Active power controller 608C has a configuration obtained by removing P limiter 681 from active power controller 608 illustrated in FIG. 9. Controller 683 performs a control operation so as to make deviation ΔPac between active power command value Pref and active power Pac calculated by subtractor 682 equal to zero, and outputs active current command value Iqref as the control operation result.

Reactive power controller 609C has a configuration obtained by removing Q limiter 691 from reactive power controller 609 illustrated in FIG. 9. Controller 693 performs a control operation so as to make deviation ΔQac between reactive power command value Qref and reactive power Qac calculated by subtractor 692 equal to zero, and outputs reactive current command value Idref as the control operation result. Alternating-current controller 603C has a configuration obtained by adding an Iq limiter 645 and an Id limiter 655 to alternating-current controller 603B illustrated in FIG. 9. Iq limiter 645 limits active current command value Iqref within a range based on active current limit value Iqmax set by limit setting unit 675C (that is, the lower limit value: —Iqmax, the upper limit value: +Iqmax). Subtractor 641 subtracts active current Iq from active current command value Iqref limited by Iq limiter 645. Controller 642 and adder 643 each have the same function as described with reference to FIG. 9.

Id limiter 655 limits reactive current command value Idref within a range based on reactive current limit value Idmax set by limit setting unit 676C (that is, the lower limit value: —Idmax, the upper limit value: +Idmax). Subtractor 651 subtracts reactive current Id from reactive current command value Idref limited by Id limiter 655. Controller 652 and adder 653 each have the same function as described with reference to FIG. 9.

With the configuration example illustrated in FIG. 10, control device 3 sets active current limit value Iqmax of active current command value Iqref for power converter 2 and reactive current limit value Idmax of reactive current command value Idref for power converter 2 in accordance with the result of the control operation for causing voltage unbalanced component Vub to follow unbalanced component command value Vubref. Then, control device 3 limits the magnitude of active current Iq by limiting active current command value Iqref within the range based on active current limit value Iqmax thus set. Further, control device 3 limits the magnitude of reactive current Id by limiting reactive current command value Idref within the range based on reactive current limit value Idmax thus set.

Specifically, when voltage unbalanced component Vub becomes larger in response to the occurrence of the open-phase fault, limit controller 607C makes active current limit value Iqmax and reactive current limit value Idmax smaller, so that the appropriate ranges of active current command value Iqref and reactive current command value Idref become smaller. Alternating-current controller 603C performs control so as to cause active current Iq to follow active current command value Iqref thus limited and cause reactive current Id to follow reactive current command value Idref thus limited. Therefore, the active component (that is, active current Iq) and the reactive component (that is, reactive current Id) of alternating current Iac output from power converter 2 become smaller. This allows a reduction in voltage unbalanced component Vub of alternating-current circuit 12.

On the other hand, when alternating-current circuit 12 enters the three-phase equilibrium state in response to the removal of the open-phase fault, voltage unbalanced component Vub becomes less than unbalanced component command value Vubref. In this case, for example, limit controller 607C sets active current limit value Iqmax and reactive current limit value Idmax equal to their respective maximum values, active current command value Iqref and reactive current command value Idref are not limited. Therefore, power converter 2 can output active current Iq and reactive current Id for the normal operation.

Note that control device 3 may be configured to set at least one of active current limit value Iqmax or reactive current limit value Idmax in accordance with the result of the control operation for causing voltage unbalanced component Vub to follow unbalanced component command value Vubref.

<Advantages>

According to the second embodiment, in addition to the advantages of the first embodiment, it is possible to individually limit the active component and the reactive component of alternating current. It is therefore possible to change the priority of output limit on the active component and the reactive component in a manner that depends on the operation of the power system.

Third Embodiment

In the first and second embodiments, the configuration where power converter 2 is a two-level converter has been described, but in the third embodiment, a configuration where power converter 2 is a modular multilevel converter (hereinafter, also referred to as an MMC converter) will be described.

<Overall Configuration of Power Conversion Device>

Figure 11:
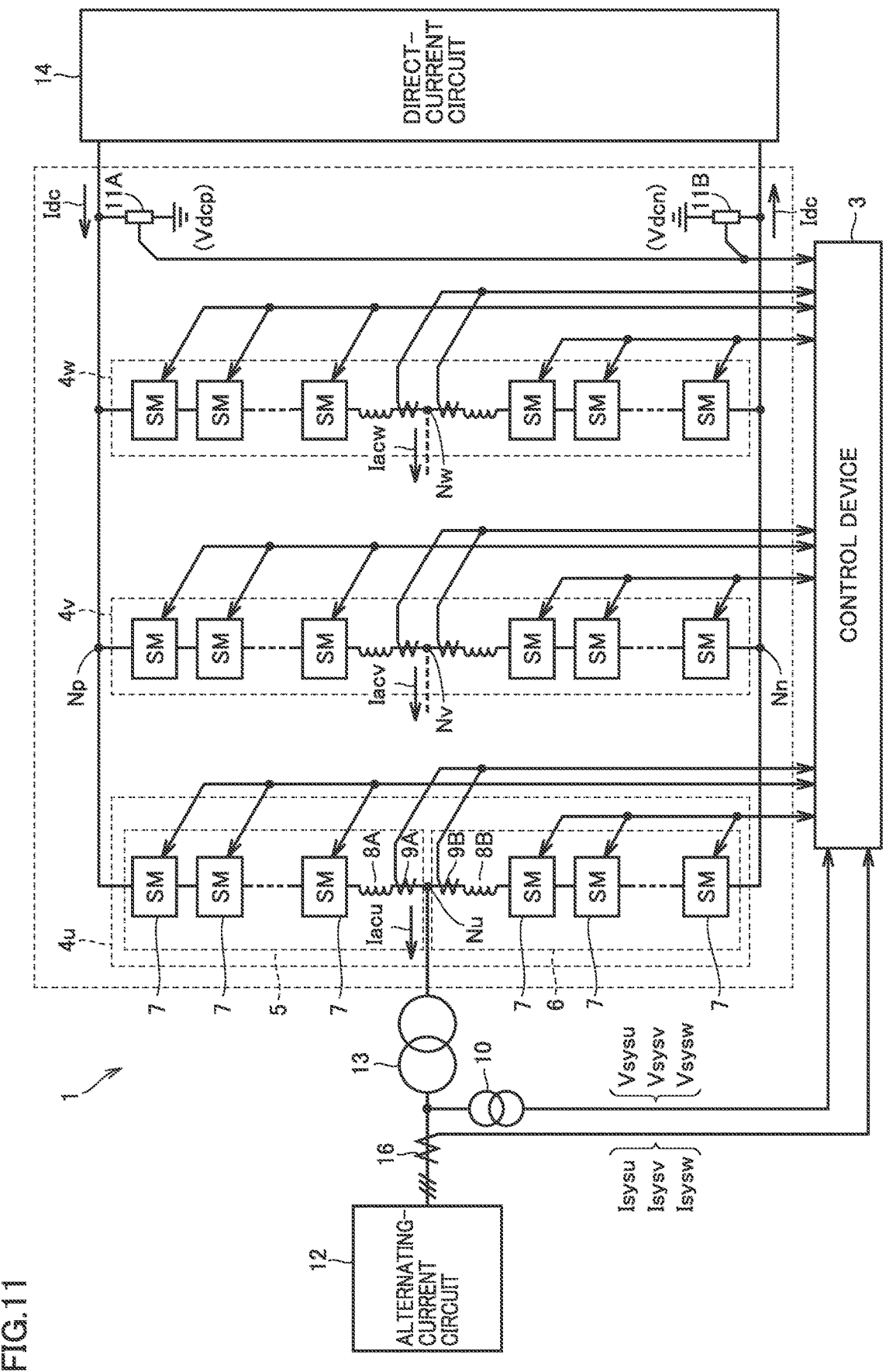
FIG. 11 is a schematic configuration diagram of a power conversion device according to a third embodiment.

FIG. 11 is a schematic configuration diagram of a power conversion device 1 according to the third embodiment. With reference to FIG. 11, power conversion device 1 according to the third embodiment includes a power converter of a modular multilevel conversion type including a plurality of sub-modules (each corresponding to "SM" in FIG. 11) 7 connected in series with each other. Therefore, power converter 2 illustrated in FIG. 11 is different from power converter 2 illustrated in FIG. 1 in the configuration of leg circuit 4. Note that each sub-module is also referred to as a "unit converter" or a "converter cell".

A leg circuit 4u of power converter 2 according to the third embodiment includes an upper arm 5 extending from a positive direct-current terminal Np to an alternating-current terminal Nu and a lower arm 6 extending from a negative direct-current terminal Nn to alternating-current terminal Nu. Alternating-current terminal Nu, which is a connection point between upper arm 5 and lower arm 6, is connected to a transformer 13. Positive direct-current terminal Np and negative direct-current terminal Nn are connected to a direct-current circuit 14. Leg circuits 4v and 4w have the same configuration, so that leg circuit 4u will be described below as a representative.

Upper arm 5 includes a plurality of sub-modules 7 connected in cascade and a reactor 8A. In upper arm 5, the plurality of sub-modules 7 and reactor 8A are connected in series. Likewise, lower arm 6 includes a plurality of sub-modules 7 connected in cascade and a reactor 8B. In the lower arm 6, the plurality of sub-modules 7 and reactor 8B are connected in series.

A position where reactor 8A is inserted may be any position in upper arm 5 of leg circuit 4u, and a position where reactor 8B is inserted may be any position in lower arm 6 of leg circuit 4u. There may be provided a plurality of reactors 8A and a plurality of reactors 8B. The reactors may be different in inductance value from each other. Only reactor 8A of upper arm 5 or only reactor 8B of lower arm 6 may be provided.

Note that leg circuits 4u, 4v, and 4w may be connected to alternating-current circuit 12 via an interconnection reactor instead of transformer 13 illustrated in FIG. 11. Furthermore, a configuration where a primary winding is provided in each of leg circuits 4u, 4v, and 4w instead of alternating-current terminals Nu, Nv, and Nw, and leg circuits 4u, 4v, and 4w are connected, in an alternating-current connection manner, to transformer 13 or the interconnection reactor via a secondary winding magnetically coupled to the primary winding may be employed. That is, leg circuit 4 may be configured to be electrically (that is, in a direct-current connection manner or alternating-current connection manner) connected to alternating-current circuit 12 via a connecting portion provided in each of leg circuits 4u, 4v, and 4w, such as alternating-current terminals Nu, Nv, and Nw or the above-described primary winding.

Power conversion device 1 according to the third embodiment further includes arm current detectors 9A and 9B in addition to alternating-current voltage detector 10, alternating-current detector 16, and direct-current voltage detectors 11A and 11B. Signals detected by the detectors are input to a control device 3. Control device 3 outputs a gate control signal for controlling operation of each sub-module 7 based on the signal detected by each detector described above. Further, control device 3 receives internal information from each sub-module 7. The internal information includes a voltage value of a capacitor of sub-module 7, status information indicating status of sub-module 7, and the like.

In FIG. 11, for ease of illustration, a signal line of a signal input from each detector to control device 3 and a signal line of a signal input and output between control device 3 and each sub-module 7 are in part collectively illustrated, but are actually provided for each detector and each sub-module 7. The signal line between each sub-module 7 and control device 3 may be provided as separate transmission and reception lines. The signal line is made up of, for example, an optical fiber.

Arm current detectors 9A and 9B provided in U-phase leg circuit 4u detect an upper arm current Ipu flowing through upper arm 5 and a lower arm current Inu flowing through lower arm 6, respectively. Arm current detectors 9A and 9B provided in V-phase leg circuit 4v detect an upper arm current Ipv and a lower arm current Inv, respectively. Arm current detectors 9A and 9B provided in W-phase leg circuit 4w detect an upper arm current Ipw and a lower arm current Inw, respectively.

Here, in power converter 2 according to the third embodiment, alternating currents Iacu, Iacy, and Iacw and a direct current Idc flowing in from direct-current circuit 14 are expressed by expressions (3) to (6) using each arm current.

$$Iacu = Ipu - Inu \quad (3)$$

$$Iacv = Ipv - Inv \quad (4)$$

$$Iacw = Ipw - Inw \quad (5)$$

$$Idc = (Ipu + Inu + Ipv + Inv + Ipw + Inw)/2 \quad (6)$$

A U-phase circulating current Izu, a V-phase circulating current Izv, and a W-phase circulating current Izw flowing through a path of a closed circuit of power converter 2 including neither alternating-current circuit 12 nor direct-current circuit 14 are expressed by the following expression (7) to (9).

$$Izu = (Ipu + Inu)/2 - Idc/3 \quad (7)$$

$$Izv = (Ipv + Inv)/2 - Idc/3 \quad (8)$$

$$Izw = (Ipw + Inw)/2 - Idc/3 \quad (9)$$

<Configuration of Sub-Module>

Figure 12:
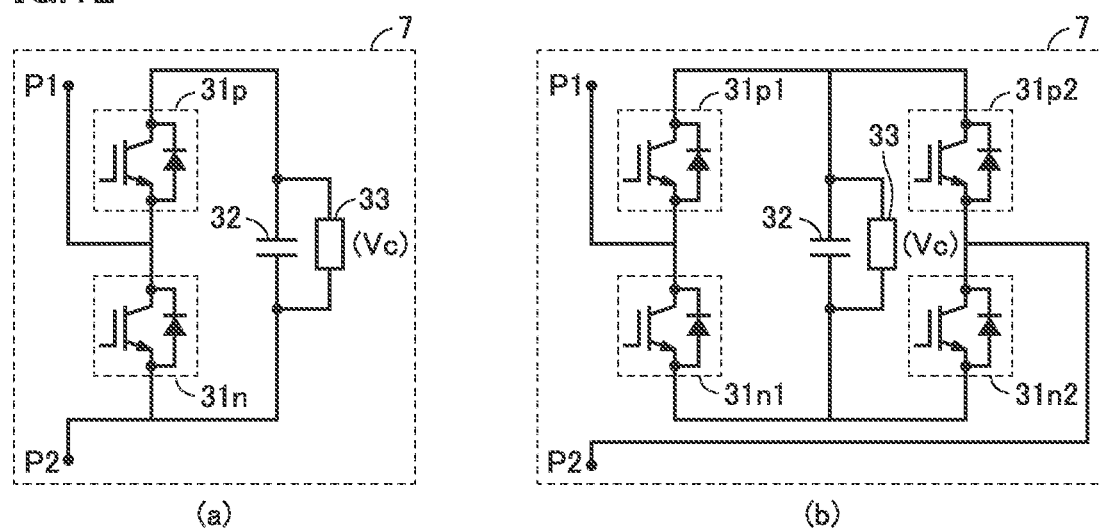
FIG. 12 is a circuit diagram illustrating an example of a sub-module.

FIG. 12 is a circuit diagram illustrating an example of the sub-module. Sub-module 7 illustrated in FIG. 12(a) has a circuit configuration called a half-bridge configuration. Sub-module 7 includes a series unit including two switching elements 31p and 31n connected in series, a capacitor 32 as an energy storage, and a voltage detector 33. The series unit and capacitor 32 are connected in parallel. Voltage detector 33 detects a voltage Vc that is a voltage across capacitor 32.

Sub-module 7 illustrated in FIG. 12(b) has a circuit configuration called a full-bridge configuration. Sub-module 7 includes a first series unit including two switching elements 31p1 and 31n1 connected in series, a second series unit including two switching elements 31p2 and 31n2 connected in series, capacitor 32, and voltage detector 33. The first series unit, the second series unit, and capacitor 32 are connected in parallel. Voltage detector 33 detects voltage Vc.

Two switching elements 31p and 31n illustrated in FIG. 12(a) and four switching elements 31p1, 31n1, 31p2, and 31n2 illustrated in FIG. 12(b) each have a configuration where a freewheeling diode is connected in antiparallel to a self-arc-extinguishing semiconductor switching element such as an IGBT, a GCT thyristor, or a metal oxide semiconductor field-effect transistor (MOSFET). Further, in FIGS. 12(a) and 12(b), a capacitor such as a film capacitor is mainly used as capacitor 32.

In the following description, switching elements 31p, 31n, 31p1, 31n1, 31p2, and 31n2 are collectively referred to as a switching element 31. Further, turning on/off the semiconductor switching element in switching element 31 will be simply referred to as "turning on/off switching element 31".

With reference to FIG. 12(a), both terminals of switching element 31n are referred to as input/output terminals P1 and P2. The voltage across capacitor 32 and a zero voltage are output by switching operations of switching elements 31p, 31n. For example, when switching element 31p is turned on and switching element 31n is turned off, the voltage across capacitor 32 is output. When switching element 31p is turned off and switching element 31n is turned on, a zero voltage is output.

Next, with reference to FIG. 12(b), a midpoint between switching element 31p1 and switching element 31n1 and a midpoint between switching element 31p2 and switching element 31n2 are defined as input/output terminals P1 and P2 of sub-module 7, respectively. Sub-module 7 illustrated in FIG. 12(b) outputs a positive voltage or a zero voltage by turning on switching element 31n2, turning off switching element 31p2, and alternately turning on switching elements 31p1 and 31n1. Further, sub-module 7 illustrated in FIG. 12(b) can output a zero voltage or a negative voltage by turning off switching element 31n2, turning on switching element 31p2, and alternately turning on switching elements 31p1 and 31n1.

In the following description, a case where sub-module 7 has a half-bridge cell configuration illustrated in FIG. 12(a) using a semiconductor switching element and a capacitor as an energy storage element will be described as an example. Alternatively, sub-module 7 may have a full-bridge configuration illustrated in FIG. 12(b). Further, a sub-module having a configuration other than the configuration described above, such as a sub-module to which a circuit configuration called a 1.5 half-bridge configuration where switching element 31p2 illustrated in FIG. 12(b) is replaced only with a diode is applied, may be used.

<Control Device>

Figure 13:
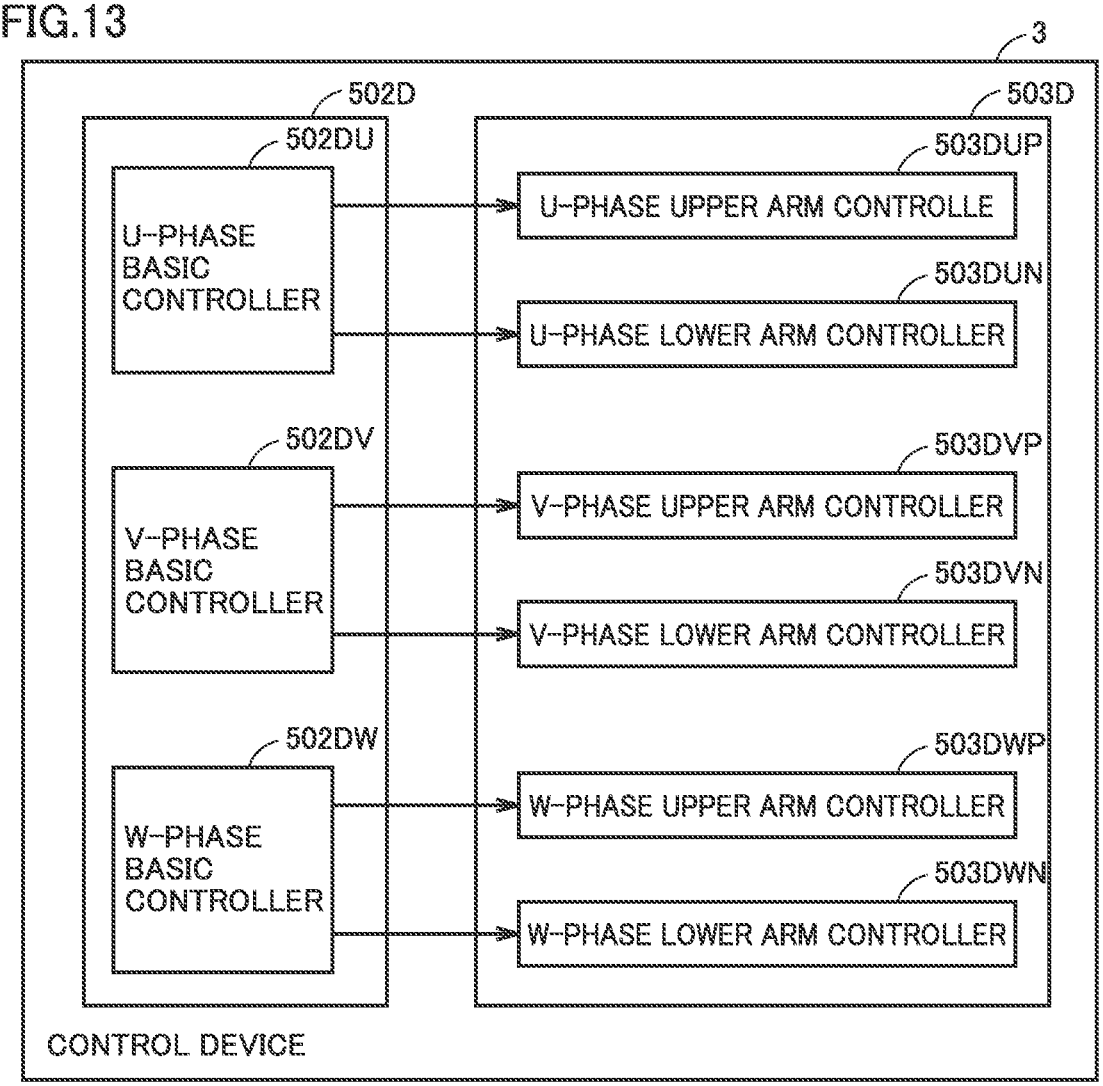
FIG. 13 is a diagram illustrating an internal configuration of a control device according to the third embodiment.

FIG. 13 is a diagram illustrating an internal configuration of control device 3 according to the third embodiment. With reference to FIG. 13, control device 3 includes a basic controller 502D and an arm controller 503D. Basic controller 502D includes a U-phase basic controller 502DU, a V-phase basic controller 502DV, and a W-phase basic controller 502DW. Arm controller 503D includes a U-phase upper arm controller 503DUP, a U-phase lower arm controller 503DUN, a V-phase upper arm controller 503DVP, a V-phase lower arm controller 503DVN, a W-phase upper arm controller 503DWP, and a W-phase lower arm controller 503DWN.

Basic controller 502D generates two arm voltage command values Krefp and Krefn for upper arm 5 and lower arm 6 of each phase using an electrical quantity measured by each detector described above. In the following description, in a case where it is not specified which one of the two arms is, two arm voltage command values Krefp and Krefn are simply referred to as an arm voltage command value Kref.

Arm controller 503D generates a gate control signal GP for controlling on and off of switching elements 31p and 31n provided in each sub-module 7 making up a corresponding arm based on arm voltage command value Kref for each arm of each phase, and outputs gate control signal GP to each sub-module 7.

Figure 14:
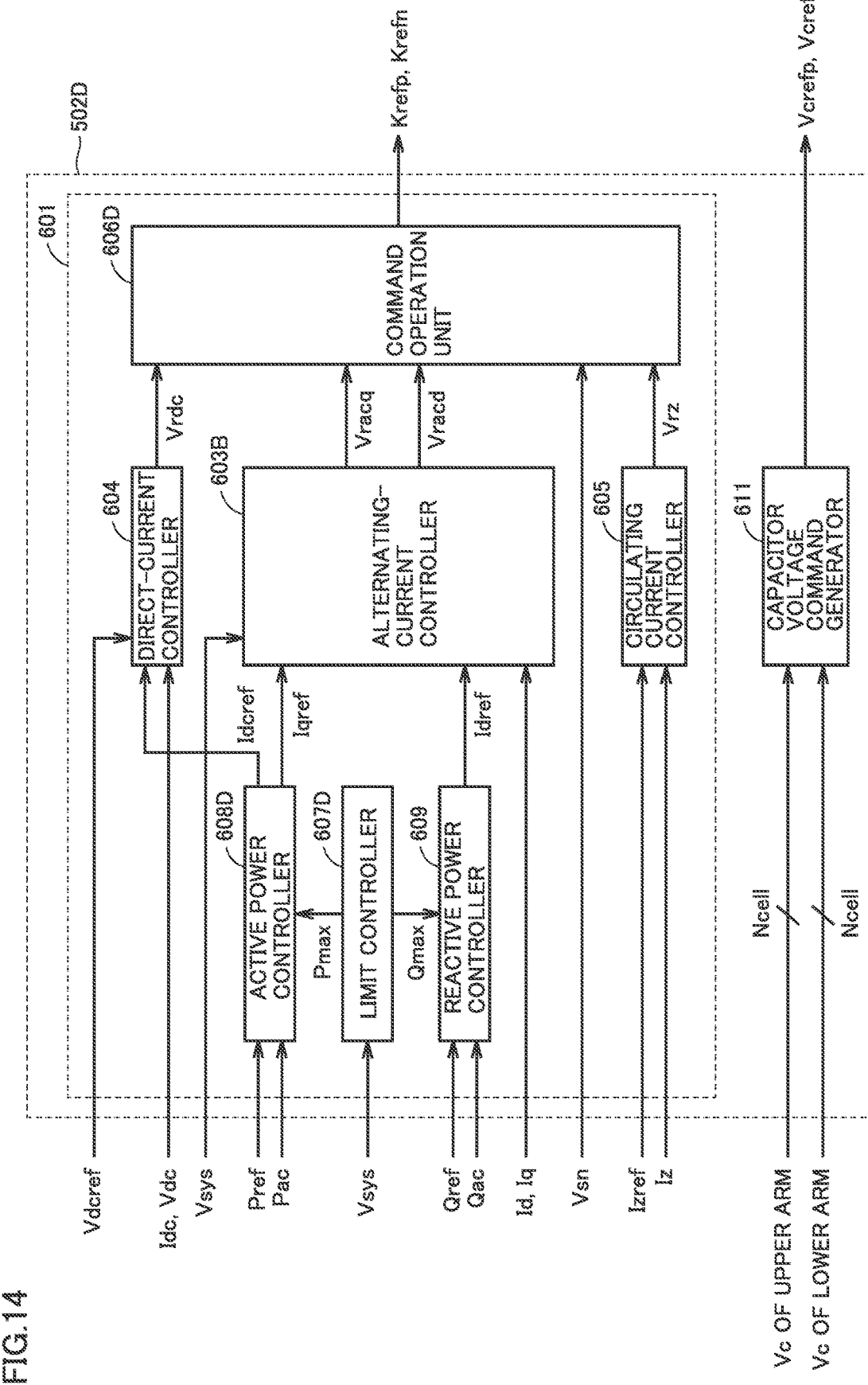
FIG. 14 is a diagram illustrating an internal configuration of a basic controller according to the third embodiment.

FIG. 14 is a diagram illustrating an internal configuration of basic controller 502D according to the third embodiment. With reference to FIG. 14, basic controller 502D outputs arm voltage command value Krefp of upper arm 5 of each phase, arm voltage command value Krefn of lower arm 6 of each phase, a capacitor voltage command value Vcrefp of upper arm 5 of each phase, and a capacitor voltage command value Vcrefn of lower arm 6 of each phase. Specifically, basic controller 502D includes an arm voltage command generator 601 and a capacitor voltage command generator 611.

Capacitor voltage command generator 611 receives voltage Vc of capacitors 32 of sub-modules 7 in the upper arm, and receives voltage Vc of capacitors 32 of sub-modules 7 in the lower arm.

Capacitor voltage command generator 611 calculates capacitor voltage command value Vcrefp of capacitors 32 of sub-modules 7 included in the upper arm. Capacitor voltage command generator 611 calculates capacitor voltage command value Vcrefn of capacitors 32 of sub-modules 7 included in the lower arm. For example, capacitor voltage command value Vcrefp is an average voltage of capacitors 32 of sub-modules 7 in the upper arm, and capacitor voltage command value Vcrefn is an average voltage of capacitors 32 of sub-modules 7 in the lower arm. In the following description, Vcrefp and Vcrefn are collectively referred to as Vcref.

Arm voltage command generator 601 calculates arm voltage command value Krefp of upper arm 5 and arm voltage command value Krefn of lower arm 6. Specifically, arm voltage command generator 601 includes an alternating-current controller 603B, a direct-current controller 604, a circulating current controller 605, a command operation unit 606D, a limit controller 607D, an active power controller 608D, and a reactive power controller 609. Limit controller 607D illustrated in FIG. 14 is substantially the same as limit controller 607B illustrated in FIG. 8. Further, alternating-current controller 603B and reactive power controller 609 each have the same function as described with reference to FIGS. 8 and 9.

Circulating current controller 605 calculates a circulating control command value Vrz for control to cause a circulating current Iz to follow a preset circulating current command value Izref (for example, zero).

Active power controller 608D is different from active power controller 608 illustrated in FIG. 8 in that active power controller 608D outputs a direct-current command value Idcref is output to direct-current controller 604.

Figure 15:
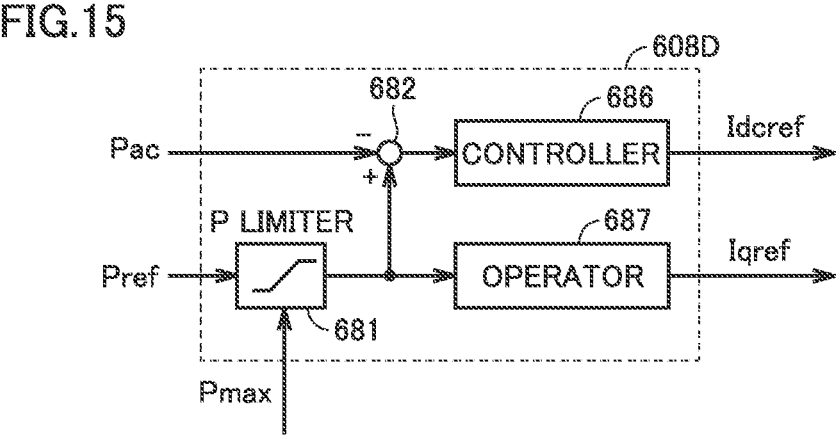
FIG. 15 is a block diagram illustrating an example of a configuration of an active power controller according to the third embodiment.

FIG. 15 is a block diagram illustrating an example of a configuration of active power controller 608D according to the third embodiment. With reference to FIG. 15, active power controller 608D includes a P limiter 681, a subtractor 682, a controller 686, and an operator 687. P limiter 681 and subtractor 682 each have the same function as described with reference to FIG. 9.

Controller 686 performs a control operation so as to make a deviation ΔPac between an active power command value Pref and an active power Pac calculated by subtractor 682 equal to zero, and outputs direct-current command value Idcref to direct-current controller 604 as the control operation result. In this respect, controller 686 is different from controller 683 illustrated in FIG. 9.

Operator 687 generates an active current command value Iqref by performing a predetermined operation for converting limited active power command value Pref into an active current command value. Operator 687 outputs active current command value Iqref thus generated to alternating-current controller 603B.

Note that active current command value Iqref may be generated in accordance with the control operation for making deviation ΔPac between active power command value Pref and active power Pac equal to zero. In this case, direct-current command value Idcref is generated by a predetermined operation for converting active power command value Pref limited by P limiter 681 into a direct-current command value.

With reference again to FIG. 14, direct-current controller 604 performs direct-current control to cause direct current Idc to follow direct-current command value Idcref. Typically, a direct-current control command value Vrdc is generated by performing feedback control for making a deviation between direct-current command value Idcref and direct current Idc equal to zero. Specifically, direct-current controller 604 calculates the deviation between direct-current command value Idcref and direct current Idc, performs a control operation so as to make the deviation equal to zero, and generates direct-current control command value Vrdc as the control operation result. Alternatively, direct-current controller 604 may be configured to perform, in a case where the direct current exceeds a predetermined upper limit value, direct-current control based on direct-current voltage control for causing a direct-current voltage Vdc to follow a direct-current voltage command value Vdcref. Typically, direct-current control command value Vrdc is generated by performing feedback control so as to make a deviation between direct-current voltage command value Vdcref and direct-current voltage Vdc equal to zero, and the above-described direct-current control is performed in a case where the direct current exceeds the upper limit value. Specifically, direct-current controller 604 calculates the deviation between direct-current voltage command value Vdcref and direct-current voltage Vdc, performs a control operation so as to make the deviation equal to zero, and generates direct-current control command value Vrdc as the control operation result.

Command operation unit 606D receives an active voltage command value Vracq, a reactive voltage command value Vracd, circulating control command value Vrz, direct-current control command value Vrdc, and a neutral point voltage Vsn. Command operation unit 606D calculates, based on these inputs, an output voltage to be shared between upper arm 5 and lower arm 6. Command operation unit 606 subtracts a voltage drop caused by an inductance component in upper arm 5 and lower arm 6 from the voltage thus calculated to determine arm voltage command value Krefp of upper arm 5 and arm voltage command value Krefn of lower arm 6.

In the MMC converter illustrated in FIG. 13, there is a possibility that the alternating current and the direct current may be individually controlled. On the other hand, when the balance between the direct-current power and the active power is lost, the capacitor voltage of sub-modules 7 fluctuates, which may prevent power converter 2 from stably continuing operation.

With the configuration example illustrated in FIG. 14, control device 3 limits the magnitude of alternating current Iac and limits the magnitude of direct current Idc flowing between power converter 2 and direct-current circuit 14 based on a result of control operation for causing a voltage unbalanced component Vub to follow an unbalanced component command value Vubref.

Specifically, when voltage unbalanced component Vub becomes larger in response to the occurrence of the open-phase fault, active power controller 608D generates active current command value Iqref and direct-current command value Idcref based on active power command value Pref limited by an active power limit value Pmax. Further, reactive power controller 609 generates a reactive current command value Idref based on a reactive power command value Qref limited by a reactive power limit value Qmax.

Therefore, an active current Iq and a reactive current Id are limited, and direct current Idc is also limited. That is, the active component (that is, active current Iq) and the reactive component (that is, reactive current Id) of alternating current Iac output from power converter 2 become smaller, and direct current Idc also becomes smaller. Therefore, even in the event of the open-phase fault, fluctuations in the capacitor voltage of power converter 2 are suppressed, and power converter 2 can continue operation.

Note that, as described in the modification of the second embodiment, the configuration where active current command value Iqref and reactive current command value Idref are limited in accordance with voltage unbalanced component Vub may also be employed in the third embodiment. In this case, limit controller 607D according to the third embodiment operates like limit controller 607C illustrated in FIG. 10.

Specifically, limit controller 607D outputs active current limit value Iqmax to an Iq limiter 645 and outputs reactive current limit value Idmax to an Id limiter 655. Furthermore, limit controller 607D outputs a direct-current limit value Idcmax to an Idc limiter in direct-current controller 604. For example, limit controller 607D sets direct-current limit value Idcmax equal to a times an allowable direct-current value based on the control operation result of controller 673 (see FIG. 10). Therefore, in a case where voltage unbalanced component Vub is larger than unbalanced component command value Vubref, direct-current limit value Idcmax is set smaller, and in a case where voltage unbalanced component Vub is smaller than unbalanced component command value Vubref, direct-current limit value Idcmax is set larger.

The Idc limiter limits direct-current command value Idcref within a range based on direct-current limit value Idcmax (that is, the lower limit value: −Idcmax, the upper limit value: +Idcmax). As a result, direct-current controller 604 generates direct-current control command value Vrdc by performing feedback control so as to make the deviation between direct-current command value Idcref thus limited and direct current Idc equal to zero and feedforward control on direct-current voltage Vdc.

<Advantages>

According to the third embodiment, in addition to the advantages of the first embodiment, it is possible to suppress fluctuations in the capacitor voltage of power converter 2 of an MMC type and continue operation even in the event of the open-phase fault.

Other Embodiment (1) In the above-described embodiments, the configuration where the unbalanced component of the alternating-current voltage is used as the unbalanced component of alternating-current circuit 12 has been described, but the present disclosure is not limited to such a configuration. For example, the current unbalanced component of alternating-current circuit 12 may be used as the unbalanced component of alternating-current circuit 12. In this case, unbalanced component detector 671 illustrated in FIG. 5 detects a current unbalanced component Iub of alternating current Isys.

In one aspect, unbalanced component detector 671 detects, as current unbalanced component Iub, a difference Di between a maximum value IAmax of the magnitudes (for example, amplitude values or effective values) of alternating currents Isysu, Isysv, and Isysw of the respective phases and a minimum value IAmin of the magnitudes of alternating currents Isysu, Isysv, and Isysw of the respective phases (that is, Di=IAmax−IAmin). In another aspect, unbalanced component detector 671 detects an absolute value of a negative sequence current flowing between alternating-current circuit 12 and power converter 2 as current unbalanced component Iub. Therefore, unbalanced component detector 671 may be configured to detect the voltage unbalanced component or the current unbalanced component of alternating-current circuit 12. Note that in a case where unbalanced component detector 671 is configured to detect the current unbalanced component, controller 673 performs a control operation so as to make a deviation ΔIub between an unbalanced component command value Iubref and current unbalanced component Iub (=Iubref−Iub) equal to zero, and outputs the control operation result. Unbalanced component command value Iubref is set in the same manner as unbalanced component command value Vubref. Specifically, unbalanced component command value Iubref is set larger than zero. Preferably, unbalanced component command value Iubref is set by an operation based on current unbalanced component Iub in the normal state with no open-phase fault.

(2) In the above-described embodiments, the configuration where controller 673 performs a control operation so as to make deviation ΔVub between unbalanced component command value Vubref and voltage unbalanced component Vub equal to zero regardless of the magnitude of voltage unbalanced component Vub, and outputs the control operation result has been described. As another example, controller 673 may be configured to perform the control operation in a case where voltage unbalanced component Vub becomes greater than or equal to a threshold Th. With such a configuration, various command values (such as alternating-current command value Iacref, alternating-current power command value Sacref, active power command value Pref, reactive power command value Qref, active current command value Iqref, and reactive current command value Idref) are limited in a case where voltage unbalanced component Vub is greater than or equal to threshold Th, but are not limited in a case where voltage unbalanced component Vub is less than threshold Th.

(3) In the third embodiment, the configuration where power converter 2 is an MMC converter has been described, but the present disclosure is not limited to such a configuration. Also in the first and second embodiments, power converter 2 may be an MMC converter.

(4) In the above-described embodiments, the configuration where one of the three phases is open as the open-phase fault in alternating-current circuit 12 has been described, but it is sufficient that two or more phases of alternating-current circuit 12 be sound, and one or more phases be open, and a mode of the open-phase fault is not limited to the above-described configuration. For example, in a case where alternating-current circuit 12 includes four phases, a mode where one phase is open or a mode where two phases are open may be employed.

(5) Each of the configurations exemplified as the above-described embodiments is an example of the configuration of the present disclosure, and may be combined with another known technique, or may be modified, for example, partially omitted, without departing from the gist of the present disclosure. Further, in the above-described embodiments, the processing and configuration described in the other embodiment may be employed and implemented as needed.

It should be understood that the embodiments disclosed herein are illustrative in all respects and not restrictive. The scope of the present disclosure is defined by the claims rather than the above description, and the present disclosure is intended to include the claims, equivalents of the claims, and all modifications within the scope.

REFERENCE SIGNS LIST

1: power conversion device, 2: power converter, 3: control device, 4u, 4v, 4w: leg circuit, 5: upper arm, 6: lower arm, 7: sub-module, 8A, 8B: reactor, 9A, 9B: arm current detector, 10: alternating-current voltage detector, 11A, 11B: direct-current voltage detector, 12: alternating-current circuit, 13: transformer, 14: direct-current circuit, 16: alternating-current detector, 32: capacitor, 33: voltage detector, 70: input converter, 71: sample and hold circuit, 72: multiplexer, 73: A/D converter, 74: CPU, 75: RAM, 76: ROM, 77: input/output interface, 78: auxiliary storage device, 79: bus, 502: basic controller, 503: arm controller, 601: arm voltage command generator, 602: alternating-current power controller, 603: alternating-current controller, 604: direct-current controller, 605: circulating current controller, 606: command operation unit, 607: limit controller, 608: active power controller, 609: reactive power controller, 611: capacitor voltage command generator, 671: unbalanced component detector, 674: limit setting unit

The invention claimed is:

1. A power conversion device comprising:
a power converter connected between a multi-phase alternating-current circuit and a direct-current circuit; and
a control device to control the power converter, wherein
the control device
  detects an unbalanced component indicating a voltage unbalanced component or a current unbalanced component of the alternating-current circuit,
  performs a control operation so as to cause the unbalanced component to follow an unbalanced component command value,
  sets a limit value for limiting a magnitude of an alternating current flowing between the power converter and the alternating-current circuit, based on a result of the control operation,
  decreases the alternating-current in accordance with the limit value that is set in a case where the unbalanced component is larger than the unbalanced component command value, and
  increases the alternating-current in accordance with the limit value that is set in a case where the unbalanced component is smaller than the unbalanced component command value.

2. The power conversion device according to claim 1, wherein the unbalanced component command value is larger than zero.

3. The power conversion device according to claim 2, wherein the unbalanced component command value is set based on a voltage unbalanced component or a current unbalanced component of the alternating-current circuit in a normal state with no open-phase fault.

4. The power conversion device according to claim 3, wherein
the limit value includes a first limit value of an alternating-current command value for the power converter, and
the control device
  decreases the first limit value in a case where the unbalanced component is larger than the unbalanced component command value,
  increases the first limit value in a case where the unbalanced component is smaller than the unbalanced component command value, and
  controls the magnitude of the alternating current, based on the alternating-current command value that is limited within a range based on the first limit value.

5. The power conversion device according to claim 3, wherein
the limit value includes a second limit value of an alternating-current power command value for the power converter, and
the control device
  decreases the second limit value in a case where the unbalanced component is larger than the unbalanced component command value,
  increases the second limit value in a case where the unbalanced component is smaller than the unbalanced component command value, and
  controls the magnitude of the alternating current, based on the alternating-current power command value that is limited within a range based on the second limit value.

6. The power conversion device according to claim 3, wherein
the limit value includes a third limit value of an active current command value for the power converter, and
the control device
  decreases the third limit value in a case where the unbalanced component is larger than the unbalanced component command value,
  increases the third limit value in a case where the unbalanced component is smaller than the unbalanced component command value, and
  controls a magnitude of an active component of the alternating current, based on the active current command value that is limited within a range based on the third limit value.

7. The power conversion device according to claim 2, wherein
the limit value includes a first limit value of an alternating-current command value for the power converter, and
the control device
  decreases the first limit value in a case where the unbalanced component is larger than the unbalanced component command value,
  increases the first limit value in a case where the unbalanced component is smaller than the unbalanced component command value, and
  controls the magnitude of the alternating current, based on the alternating-current command value that is limited within a range based on the first limit value.

8. The power conversion device according to claim 2, wherein
the limit value includes a second limit value of an alternating-current power command value for the power converter, and
the control device
  decreases the second limit value in a case where the unbalanced component is larger than the unbalanced component command value,
  increases the second limit value in a case where the unbalanced component is smaller than the unbalanced component command value, and controls the magnitude of the alternating current, based on the alternating-current power command value that is limited within a range based on the second limit value.

9. The power conversion device according to claim 2, wherein
the limit value includes a third limit value of an active current command value for the power converter, and
the control device
decreases the third limit value in a case where the unbalanced component is larger than the unbalanced component command value,
increases the third limit value in a case where the unbalanced component is smaller than the unbalanced component command value, and
controls a magnitude of an active component of the alternating current, based on the active current command value that is limited within a range based on the third limit value.

10. The power conversion device according to claim 2, wherein
the limit value includes a fourth limit value of a reactive current command value for the power converter, and
the control device
decreases the fourth limit value in a case where the unbalanced component is larger than the unbalanced component command value,
increases the fourth limit value in a case where the unbalanced component is smaller than the unbalanced component command value, and
controls a magnitude of a reactive component of the alternating current, based on the reactive current command value that is limited within a range based on the fourth limit value.

11. The power conversion device according to claim 1, wherein
the limit value includes a first limit value of an alternating-current command value for the power converter, and
the control device
decreases the first limit value in a case where the unbalanced component is larger than the unbalanced component command value,
increases the first limit value in a case where the unbalanced component is smaller than the unbalanced component command value, and
controls the magnitude of the alternating current, based on the alternating-current command value that is limited within a range based on the first limit value.

12. The power conversion device according to claim 1, wherein
the limit value includes a second limit value of an alternating-current power command value for the power converter, and
the control device
decreases the second limit value in a case where the unbalanced component is larger than the unbalanced component command value,
increases the second limit value in a case where the unbalanced component is smaller than the unbalanced component command value, and
controls the magnitude of the alternating current, based on the alternating-current power command value that is limited within a range based on the second limit value.

13. The power conversion device according to claim 1, wherein
the limit value includes a third limit value of an active current command value for the power converter, and
the control device
decreases the third limit value in a case where the unbalanced component is larger than the unbalanced component command value,
increases the third limit value in a case where the unbalanced component is smaller than the unbalanced component command value, and
controls a magnitude of an active component of the alternating current, based on the active current command value that is limited within a range based on the third limit value.

14. The power conversion device according to claim 1, wherein
the limit value includes a fourth limit value of a reactive current command value for the power converter, and
the control device
decreases the fourth limit value in a case where the unbalanced component is larger than the unbalanced component command value,
increases the fourth limit value in a case where the unbalanced component is smaller than the unbalanced component command value, and
controls a magnitude of a reactive component of the alternating current, based on the reactive current command value that is limited within a range based on the fourth limit value.

15. The power conversion device according to claim 1, wherein
the limit value includes a fifth limit value of an active power command value for the power converter, and
the control device
decreases the fifth limit value in a case where the unbalanced component is larger than the unbalanced component command value,
increases the fifth limit value in a case where the unbalanced component is smaller than the unbalanced component command value, and
controls a magnitude of an active component of the alternating current, based on the active power command value that is limited within a range based on the fifth limit value.

16. The power conversion device according to claim 15, wherein the control device generates a direct current command value for the power converter, based on the active power command value that is limited within the range based on the fifth limit value of the active power command value.

17. The power conversion device according to claim 1, wherein
the limit value includes a sixth limit value of a reactive power command value for the power converter, and
the control device
decreases the sixth limit value in a case where the unbalanced component is larger than the unbalanced component command value,
increases the sixth limit value in a case where the unbalanced component is smaller than the unbalanced component command value, and
controls a magnitude of a reactive component of the alternating current, based on the reactive power command value that is limited within a range based on the sixth limit value.

18. The power conversion device according to claim 1, wherein the voltage unbalanced component is a difference between a maximum value and a minimum value of magnitudes of voltages of the respective phases of the alternating-current circuit, and the current unbalanced component is a difference between a maximum value and a minimum value of magnitudes of currents of the respective phases of the alternating-current circuit.

19. The power conversion device according to claim 1, wherein the voltage unbalanced component is an absolute value of a negative sequence voltage of the alternating-current circuit, and the current unbalanced component is an absolute value of a negative sequence current flowing between the alternating-current circuit and the power converter.

20. The power conversion device according to claim 1, wherein the power converter is a power converter of a modular multilevel conversion type.

* * * * *